(12) United States Patent
Khan et al.

(10) Patent No.: US 12,262,077 B2
(45) Date of Patent: Mar. 25, 2025

(54) USER INTERFACES FOR VIDEO EDITING APPLICATION ON TOUCH SCREEN DEVICE

(71) Applicant: Apple Inc., Cupertino, CA (US)

(72) Inventors: Itrat U Khan, San Jose, CA (US); Nathan T Bingham, Renton, WA (US); Muhammad H Khawar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/314,110

(22) Filed: May 8, 2023

(65) Prior Publication Data

US 2024/0380939 A1 Nov. 14, 2024

Related U.S. Application Data

(60) Provisional application No. 63/500,897, filed on May 8, 2023.

(51) Int. Cl.
| | |
|---|---|
| *H04N 21/431* | (2011.01) |
| *G06F 3/04847* | (2022.01) |
| *G06F 3/0488* | (2022.01) |
| *G06F 3/04883* | (2022.01) |
| *G06T 5/70* | (2024.01) |
| *G06T 5/73* | (2024.01) |

(Continued)

(52) U.S. Cl.
CPC ..... *H04N 21/4312* (2013.01); *G06F 3/04847* (2013.01); *G06F 3/0488* (2013.01); *G06F 3/04883* (2013.01); *G06T 5/70* (2024.01); *G06T 5/73* (2024.01); *G06T 5/92* (2024.01); *G06T 11/001* (2013.01); *G06V 10/70* (2022.01); *G11B 27/031* (2013.01); *H04N 7/0122* (2013.01); *H04N 21/47217* (2013.01); *G06T 2200/24* (2013.01); *G06T 2207/10016* (2013.01)

(58) Field of Classification Search
CPC .......... H04N 21/4312; H04N 21/47217; G06F 3/0488; G06F 3/04883; G06F 3/04847; G06T 5/73; G06T 5/70; G06T 5/92; G06T 11/001; G06T 2207/10016; G06T 2200/24; G06V 10/70; G11B 27/031
See application file for complete search history.

(56) References Cited

U.S. PATENT DOCUMENTS

| | | |
|---|---|---|
| 5,521,841 A | 5/1996 | Arman et al. |
| 5,758,093 A | 5/1998 | Boezeman et al. |

(Continued)

*Primary Examiner* — Tadesse Hailu
(74) *Attorney, Agent, or Firm* — Invoke

(57) ABSTRACT

In one or more embodiments, a computing device is configured to display a first frame, of a media composition, corresponding to a first position of a moveable playhead along a timeline. The first frame is displayed in a first display area of a GUI, while the timeline is concurrently displayed in a second display area of the GUI. The computing device also detects an initiation of a hover user input associated with a second position along the timeline. Responsive to detecting the initiation of the hover user input, the computing device replaces, in the first display area of the GUI, the display of the first frame with a display of the second frame of the media composition. Thereafter, responsive to detecting termination of the hover user input, the computing device resumes a display of the first frame of the media composition in the first display area of the GUI.

18 Claims, 18 Drawing Sheets

(51) Int. Cl.
*G06T 5/92* (2024.01)
*G06T 11/00* (2006.01)
*G06V 10/70* (2022.01)
*G11B 27/031* (2006.01)
*H04N 7/01* (2006.01)
*H04N 21/472* (2011.01)

(56) References Cited

U.S. PATENT DOCUMENTS

| | | | |
|---|---|---|---|
| 5,760,767 | A | 6/1998 | Shore et al. |
| 5,852,435 | A | 12/1998 | Vigneaux et al. |
| 6,332,147 | B1 | 12/2001 | Moran et al. |
| 6,463,444 | B1 | 10/2002 | Jain et al. |
| RE38,401 | E | 1/2004 | Goldberg et al. |
| RE38,609 | E | 10/2004 | Chen et al. |
| 6,807,361 | B1 | 10/2004 | Girgensohn et al. |
| 7,143,362 | B2 | 11/2006 | Dieberger et al. |
| 7,149,974 | B2 | 12/2006 | Girgensohn et al. |
| 7,660,464 | B1 | 2/2010 | Peterson |
| 8,745,499 | B2 * | 6/2014 | Pendergast ....... H04N 21/47205 715/713 |
| 9,600,164 | B2 * | 3/2017 | Matsuda ................ G11B 27/34 |
| 10,497,162 | B2 | 12/2019 | Kunkel et al. |
| 10,937,200 | B2 | 3/2021 | Kumar et al. |
| 11,425,283 | B1 | 8/2022 | Thurston et al. |
| 11,550,452 | B1 * | 1/2023 | Fortunato ........... G06F 3/04847 |
| 11,669,567 | B2 * | 6/2023 | Klein ..................... G10L 17/18 707/706 |
| 11,743,550 | B2 | 8/2023 | Atkins et al. |
| 11,749,312 | B2 * | 9/2023 | Bache ................... G11B 27/34 715/229 |
| 11,887,630 | B2 * | 1/2024 | Wu ....................... G06F 40/186 |
| 2003/0184598 | A1 | 10/2003 | Graham |
| 2003/0189588 | A1 | 10/2003 | Girgensohn et al. |
| 2005/0084232 | A1 | 4/2005 | Herberger et al. |
| 2006/0093309 | A1 | 5/2006 | Herberger et al. |
| 2014/0267094 | A1 * | 9/2014 | Hwang ................. G06F 3/0488 345/173 |
| 2015/0077338 | A1 * | 3/2015 | Dai ..................... G06F 3/04883 345/157 |
| 2015/0234564 | A1 | 8/2015 | Snibbe et al. |
| 2016/0006979 | A1 * | 1/2016 | Gilboa-Solomon ........................ G11B 27/005 386/248 |
| 2016/0103830 | A1 * | 4/2016 | Cheong ................ G06F 16/745 715/738 |
| 2016/0358631 | A1 | 12/2016 | Lee |
| 2017/0352379 | A1 | 12/2017 | Oh et al. |
| 2017/0364198 | A1 * | 12/2017 | Yoganandan ....... G06F 3/04815 |
| 2019/0114485 | A1 | 4/2019 | Chan et al. |
| 2020/0296317 | A1 | 9/2020 | Post et al. |
| 2021/0004131 | A1 * | 1/2021 | Varshney ............. G11B 27/005 |
| 2022/0028427 | A1 * | 1/2022 | Matsuda .............. H04N 5/2625 |
| 2022/0327830 | A1 | 10/2022 | Chang et al. |
| 2022/0335720 | A1 | 10/2022 | Chang et al. |
| 2022/0353425 | A1 | 11/2022 | Manzari et al. |
| 2023/0281904 | A1 | 9/2023 | Habib et al. |

* cited by examiner

USER INTERFACES FOR VIDEO EDITING APPLICATION ON TOUCH SCREEN DEVICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

INCORPORATION BY REFERENCE; DISCLAIMER

The following application is hereby incorporated by reference: application No. 63/500,897 filed on May 8, 2023. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to user interfaces for use with a video editing application on a touchscreen device.

BACKGROUND

Changing the layout of display areas on a tablet or slate computer, where user input is often received via a touchscreen display, can be difficult. Moving around objects accurately on a touchscreen display, when using a fingertip touch input is utilized, is difficult because a user's fingertip is many times larger in size than the area trying to be touched to impart desired change(s). Moreover, quickly moving through a media composition is error-prone and sometimes impractical using touch input methods.

OVERVIEW

In some implementations, a computing device is configured to display a first video frame, of a media composition, corresponding to a first position of a moveable playhead along a timeline. The first video frame is displayed in a first display area of a graphical user interface (GUI), while the timeline is concurrently displayed in a second display area of the GUI. The computing device is configured to detect an initiation of a hover user input associated with a second position along the timeline. Responsive to detecting the initiation of the hover user input, the computing device is configured to replace, in the first display area of the GUI, the display of the first video frame with a display of the second video frame of the media composition. Thereafter, responsive to detecting termination of the hover user input, the computing device is configured to resume a display of the first video frame of the media composition in the first display area of the GUI.

In one or more implementations, different types of hover user inputs may be detected by the computing device to trigger the preview of the second video frame. A first type of hover user input is positioned over the second position along the timeline. A second type of hover user input is positioned over a representation of a second video frame of the media composition that corresponds to the second position along the timeline.

In some implementations, the first video frame is displayed during playback of the media composition. As the media composition is played back, a particular video frame of the media composition is displayed according to the position of the moveable playhead along the timeline at any given moment in time. This playback may be replaced with the indicated second video frame based on the hover user input being detected.

In one or more implementations, the computing device is configured to detect an initiation of a subsequent hover user input associated with a third video frame. The subsequent hover user input may be of one of the following types: a third hover user input over a third position along the timeline associated with the third video frame, or a fourth hover user input positioned over a representation of a media clip that corresponds to the third video frame. Responsive to detecting the initiation of the subsequent hover user input, the computing device is configured to replace the display of the second video frame with a display of the third video frame in the first display area of the GUI.

In some implementations, a computing device may display a GUI that includes a set of user-adjustable display areas. Each of the set of user-adjustable display areas have corresponding dimensions including a height dimension and a width dimension. The computing device may receive a single touch input adjusting a first dimension of a first user-adjustable display area and responsive to receiving the single touch input, one or more adjustments may be made to the GUI. The computing device may adjust the first dimension of the first user-adjustable display area and adjust both a height dimension and a width dimension of a second user-adjustable display area.

In an implementation, the set of user-adjustable display areas fully cover a particular region of the graphical user interface. In this implementation, the computing device may compute an adjustment of the height dimension and the width dimension of the second user-adjustable display area such that subsequent to the adjustment, the particular region of the GUI remains fully covered by the set of user-adjustable display areas.

In some implementations, the computing device may modify a layout of the set of user-adjustable display areas in response to receiving the single touch input. One such modification may include swapping a horizontal position of the second user-adjustable display area in relation to a third user-adjustable display area. Another modification may include swapping a vertical position of the second user-adjustable display area in relation to a third user-adjustable display area. More modifications may include changing the layout from row-based to column-based, or from column-based to row-based.

Particular implementations provide at least the following advantages. A user is able to change a display layout and preview portions of a media composition with greater accuracy using touch-based user inputs. The accuracy that is possible using these touch-based user inputs are similar with the accuracy of input techniques available on desktop devices.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Architecture

Figure 1:
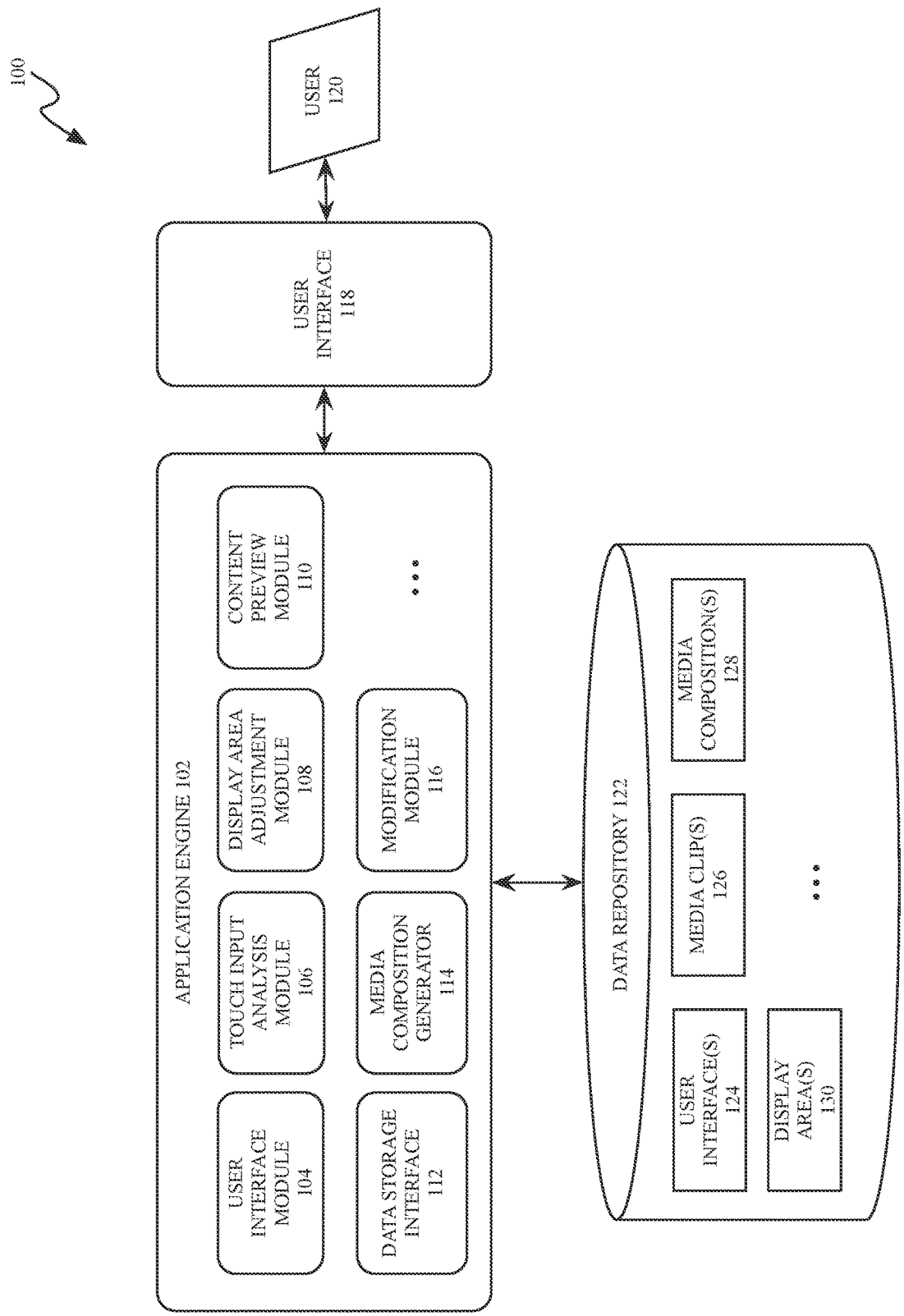
FIG. 1 is a block diagram of an example system for manipulating a graphical user interface based on touch input.

FIG. 1 is a block diagram of an example system 100 for manipulating a graphical user interface (GUI) based on touch input. System 100 includes an application engine 102 that is electronically coupled to at least one data repository 122. Application engine 102 includes a set of modules and/or processes configured for performing one or more functions for capturing touch user input on a touchscreen display and performing specific functions related to display of information on the touchscreen display, which are described below.

In one or more approaches, user interface module 104 of the application engine 102 is configured to create and/or build one or more user interfaces 118 for providing information to a user 120. The user interface 118 may be configured to be used on a touchscreen display, and the user interface module 104 may be configured to receive touch user inputs via the user interface 118 using the touchscreen display. The user interface 118 may be dynamically updated based on user input received through the user interface 118 in various embodiments.

In one embodiment, user interface module 104 is configured to generate and display, via the touchscreen display, a GUI that includes a set of user-adjustable display areas. Each of the user-adjustable display areas are associated with corresponding dimensions when displayed in the GUI. These dimensions include a height dimension and a width dimension.

Each user-adjustable display area is configured to display certain information to the user 120. For example, a user-adjustable display area may include a timeline for manipulating and displaying temporal positioning within a media composition 128 and/or various media clip(s) 126. In another example, a user-adjustable display area may include a set of media clips 126 for addition to the media composition 128.

According to one example, a user-adjustable display area may include a media clip informational window that displays additional details about a media clip 126 and/or media composition 128, such as name, date of creation/modification, length, type of media, a pictograph of audio/video content therein, a frame browser, etc.

In an example, a user-adjustable display area may include a playback window for viewing current frame(s) of a chosen media source (e.g., media clip 126, media composition 128, etc.) which may include playback controls (play, stop, pause, fast forward, reverse, etc.).

In another example, a user-adjustable display area may include a view options window for selecting options regarding how things are displayed, e.g., options associated with the appearance and functionality of the GUI, view options associated with playback of selected media clip(s) 126 and/or media composition(s) 128 in the playback window, modification options associated with selected media clip(s) 126 and/or media composition(s) 128, etc.

One or more user interfaces 124 that have been generated by user interface module 104, alone or in conjunction with one or more display areas 130 used therein, may be stored to the data repository 122, in various approaches. The user interfaces 124 may be generated based on user interface templates, display area layouts, and/or dynamically created. The generated user interfaces 124 may be stored to data repository 122 with some associated identifier for quicker searching and retrieval when a specific type of user interface is requested for presentation to the user 120.

Touch input analysis module 106 of the application engine 102 is configured to analyze touch input provided by the user 120 that is received in the active user interface 118 displayed to the touchscreen display. These touch inputs may include finger touch inputs, stylus touch inputs, and/or hover inputs where a user 120 hovers close to the touchscreen display but does not actually contact the touchscreen display. A hover input may cause a different action to be taken versus a touch contact. Moreover, swipe inputs and multiple tap inputs may also be received via the touchscreen display and may result in different actions to be taken versus a single touch contact.

In one embodiment, the single touch input may be a click and drag user input that moves an edge of a particular user-adjustable display area, either outwardly from the center indicating an increase in size, or inwardly toward the center indicating a decrease in size. In another embodiment, the single touch input may be a user input that selects a graphical interface element associated with the particular user-adjustable display area, such as a button to close the particular user-adjustable display area, a control that causes the particular user-adjustable display area to expand to full screen, a selector to minimize the particular user-adjustable display area, etc.

According to one approach, the single touch input may be a swipe input. In one embodiment, the swipe input may begin on a portion of the particular user-adjustable display area and end at an edge of the GUI or outside of an area of the GUI or touchscreen display. This swipe input may indicate minimizing, shrinking, removing, or closing the particular user-adjustable display area in various approaches. In another embodiment, the swipe input may begin at an edge of the GUI or outside of the area of the GUI or touchscreen display and end at a location within the GUI. This swipe input may indicate opening, revealing, maximizing, or growing the particular user-adjustable display area in various approaches.

Touch input analysis module 106, in one or more embodiments, is configured to detect the single touch input adjusting one dimension of a particular user-adjustable display area of the set of user-adjustable display areas shown in user interface 118. Touch input analysis module 106 analyzes this touch input that adjusts one dimension of the particular user-adjustable display area to determine which dimension has changed and the amount of the change indicated by the single user touch input. This information is provided in real time to display area adjustment module 108 to compute how to adjust the particular user-adjustable display area and possibly other user-adjustable display areas displayed to user interface 118 to maximize use of the total display area of the GUI based on the user's requested dimension change.

Display area adjustment module 108 is configured to modify the display areas 130 within the active user interface 118 based on the received touch input. In one embodiment, responsive to receiving the single touch input, display area adjustment module 108 computes, in real time, adjustments for both a height dimension and a width dimension of another user-adjustable display area displayed on interface 118, along with the adjustment determined for the dimension of the particular user-adjustable display area manipulated by the user 120. User interface module 104, alone or in conjunction with display area adjustment module 108, uses these determined adjustments to modify user interface 118 to adjust both the height dimension and the width dimension of the other user-adjustable display area while adjusting the first dimension of the particular user-adjustable display area manipulated by the user 120.

In one approach, the set of user-adjustable display areas fully cover a particular region of the GUI. In this approach, display area adjustment module 108 computes an adjustment of the height dimension and the width dimension of the other user-adjustable display area such that subsequent to this adjustment, the particular region of the GUI remains fully covered by the set of user-adjustable display areas.

In one or more embodiments, responsive to receiving the single touch input, display area adjustment module 108 may also modify a layout of the set of user-adjustable display areas to swap horizontal positions of at least two of the user-adjustable display areas (which may include or exclude swapping a horizontal position of the particular user-adjustable display area manipulated by the user 120). In these instances, the vertical dimension of the other user-adjustable display area is different than a vertical dimension of the user-adjustable display area for which it is swapped horizontally. Moreover, the display area adjustment module 108 may modify the layout based on the difference in vertical dimensions of the swapped user-adjustable display areas, as swapping these display areas horizontally may enable more effective display for the information included in the set of display areas rather than swapping other display areas or changing the dimension without performing a swap.

In some embodiments, responsive to receiving the single touch input, display area adjustment module 108 may modify the layout of the set of user-adjustable display areas to swap vertical positions of at least two of the user-adjustable display areas (which may include or exclude swapping a vertical position of the particular user-adjustable display area manipulated by the user 120). In these instances, the horizontal dimension of the other user-adjustable display area is different than a horizontal dimension of the user-adjustable display area for which it is swapped vertically. Moreover, the display area adjustment module 108 may modify the layout based on the difference in horizontal dimensions of the swapped user-adjustable display areas, as swapping these display areas vertically may enable more effective display for the information included in the set of display areas or changing the dimension without performing a swap.

According to one approach, when display area adjustment module 108 adjusts both the height dimension and the width dimension of the other user-adjustable display area, a size of the other user-adjustable display area may increase and grow in size. In other words, the percentage of area of the overall GUI occupied by the other display area may increase and become larger relative to the other display areas in the set of display areas.

According to an approach, when display area adjustment module 108 adjusts both the height dimension and the width dimension of the other user-adjustable display area, a size of the other user-adjustable display area may decrease and shrink in size. In other words, the percentage of area of the overall GUI occupied by the other display area may decrease and become smaller relative to the other display areas in the set of display areas.

In another approach, when display area adjustment module 108 adjusts both the height dimension and the width dimension of the other user-adjustable display area, the other user-adjustable display area is removed from the GUI. The removal may be a result of a request to minimize or close the other user-adjustable display area.

In some embodiments, responsive to receiving the single touch input, display area adjustment module 108 may adjust a height dimension, a width dimension, or both, for a third user-adjustable display area. In these embodiments, the single touch input causes adjustment of dimensions of three or more of the user-adjustable display areas in the GUI, to enable more effective display for the information included in the set of display areas.

In one or more embodiments, responsive to receiving the single touch input, display area adjustment module 108 may modify a layout of the set of user-adjustable display areas from row-based to column-based, or from column-based to row-based. In some approaches, portions of the GUI may be changed from row-based to column-based, or from column-based to row-based to enable more effective display for the information included in the set of display areas.

In one embodiment, content preview module 110 is configured to display, in a primary user-adjustable display area of the set of user-adjustable display areas, a preview of a portion of a media clip 126 or media composition 128 that is not currently being played in the primary user-adjustable display area. In some approaches, the primary user-adjustable display area may be used to playback a media clip 126 and/or media composition 128 for viewing by the user 120 via the user interface 118.

In this embodiment, the primary user-adjustable display area displays a first video frame (e.g., of a media clip 126 and/or media composition 128) corresponding to a first position of a moveable playhead along a timeline (e.g., shown in a separate user-adjustable display area). The touch input analysis module 106 detects an initiation of a hover user input associated with a second position along the timeline. The hover user input indicates a second video frame that the user 120 wants to preview without actually adjusting the playback position of whatever content is being displayed in the primary user-adjustable display area.

For example, the hover user input may be a first type of hover user input where the user 120 hovers (e.g., a finger or stylus) over a second position along the timeline. The second position is a location associated with the second video frame somewhere on the timeline that is different than the first position associated with the currently displayed first video frame of the media composition 128.

In another example, the hover user input may be a second type of hover user input where the user 120 hovers over a representation of a second video frame of the media composition that corresponds to the second position along the timeline. The representation of the second video frame may be a thumbnail associated with a source of the second video frame, a video playing in a separate display area, etc.

According to another example, the hover user input may be a third type of hover user input where the user 120 hovers over a pictograph associated with the source of the second video frame at a position related to the second video frame.

Responsive to detecting the initiation of the hover user input, content preview module 110 causes the display of the first video frame to be replaced with a display of the second video frame of the media composition in the primary display area of the GUI. In one embodiment, content preview module 110 communicates with one or more of the user interface module 104, the modification module 116, and/or the data storage interface 112 to cause the user interface 118 to display the second video frame of the media composition in the primary display area.

Touch input analysis module 106 may detect termination of the hover user input. This termination may be causes by the user actually touching the touchscreen display (at the same position as the hover input or elsewhere), moving beyond the threshold distance from the touchscreen display, indication of termination by the user, etc.

Responsive to detecting termination of the hover user input, content preview module 110 causes resumption of display of the first video frame of the media composition in the first display area of the GUI. In one embodiment, content preview module 110 communicates with one or more of the user interface module 104, the modification module 116, and/or the data storage interface 112 to cause the user interface 118 to resume display of the first video frame of the media composition in the primary display area.

In an approach, the first video frame may be displayed during playback of the media composition. In this approach, the first video frame is displayed during playback based on the position of the moveable playhead along the timeline at a moment in time corresponding to the first video frame within the media composition 128.

According to one or more approaches, touch user input may be received while presenting a playback of a media composition 128 on the touchscreen display of a computing device. A media composition 128 may include video, audio, images, moving images, animations, etc., or any combination thereof. In an embodiment, media composition generator 114 may generate the media composition 128, based on available media content and/or user input.

Media composition generator 114 may generate the media composition 128 based on one or more media clips 126. The modification module 116 is configured to allow the user 120 to provide one or more modifications to the media clip(s) 126 and/or media composition(s) 128. The modification module 116 receives user input modifying the media clip(s) 126 and/or media composition(s) 128. The user input modifying the media clip(s) 126 and/or media composition(s) 128 may be provided to the modification module 116 by the user interface module 104 or touch input analysis module 106, in various approaches. In response to the user input modifying the media clip(s) 126 and/or media composition(s) 128, modification module 116 may adjust and/or modify the media clip(s) 126 and/or media composition(s) 128 in accordance with the user input.

In one embodiment, the modification user input may indicate a new duration for the media clip(s) 126 and/or media composition(s) 128. In response to the indicated new duration, modification module 116 will adjust the media clip(s) 126 and/or media composition(s) 128 to have the new duration. After this modification, during each subsequent playback of the media clip(s) 126 and/or media composition(s) 128, the media clip(s) 126 and/or media composition(s) 128 is played for the new duration instead of the original duration.

In an embodiment, user input may modify one or more media clips 126. For example, modifications may include, but are not limited to, clipping the media clip 126 to remove at least one portion of the media clip 126 (e.g., making the media clip 126 shorter in duration and removing content from an end), shrinking the media clip 126 to condense content of the media clip during playback of the media clip (e.g., shrinking the duration of playback but not removing any content), expanding the media clip 126 to stretch the content of the media clip 126 during playback of the media clip (e.g., expanding the duration of playback without adding any content), etc.

In response to the modifications to the media clip(s) 126, modification module 116 will adjust the media clip(s) 126 to generate a modified version of the media clip(s) that shows the modifications. These modified media clip(s) may also be stored to data repository 122.

Application engine 102 includes a data storage interface 112 for storing data to data repository 122 and for retrieving data from data repository 122. Data repository 122 may be used to store information and/or data for application engine 102 and may be any type of storage unit and/or device (e.g., a file system, database, collection of tables, or any other storage mechanism) for storing data. Further, data repository 122 may include multiple different storage units and/or devices. The multiple different storage units and/or devices may or may not be of the same type or located at the same physical site. Data repository 122 may be implemented or may execute on the same computing system as application engine 102. Alternatively or additionally, data repository 122 may be implemented or executed on a computing system separate from application engine 102. Data repository 122 may be communicatively coupled to any device for transmission and receipt of data via a direct connection or via a network.

Example User Interfaces

Figure 2A:
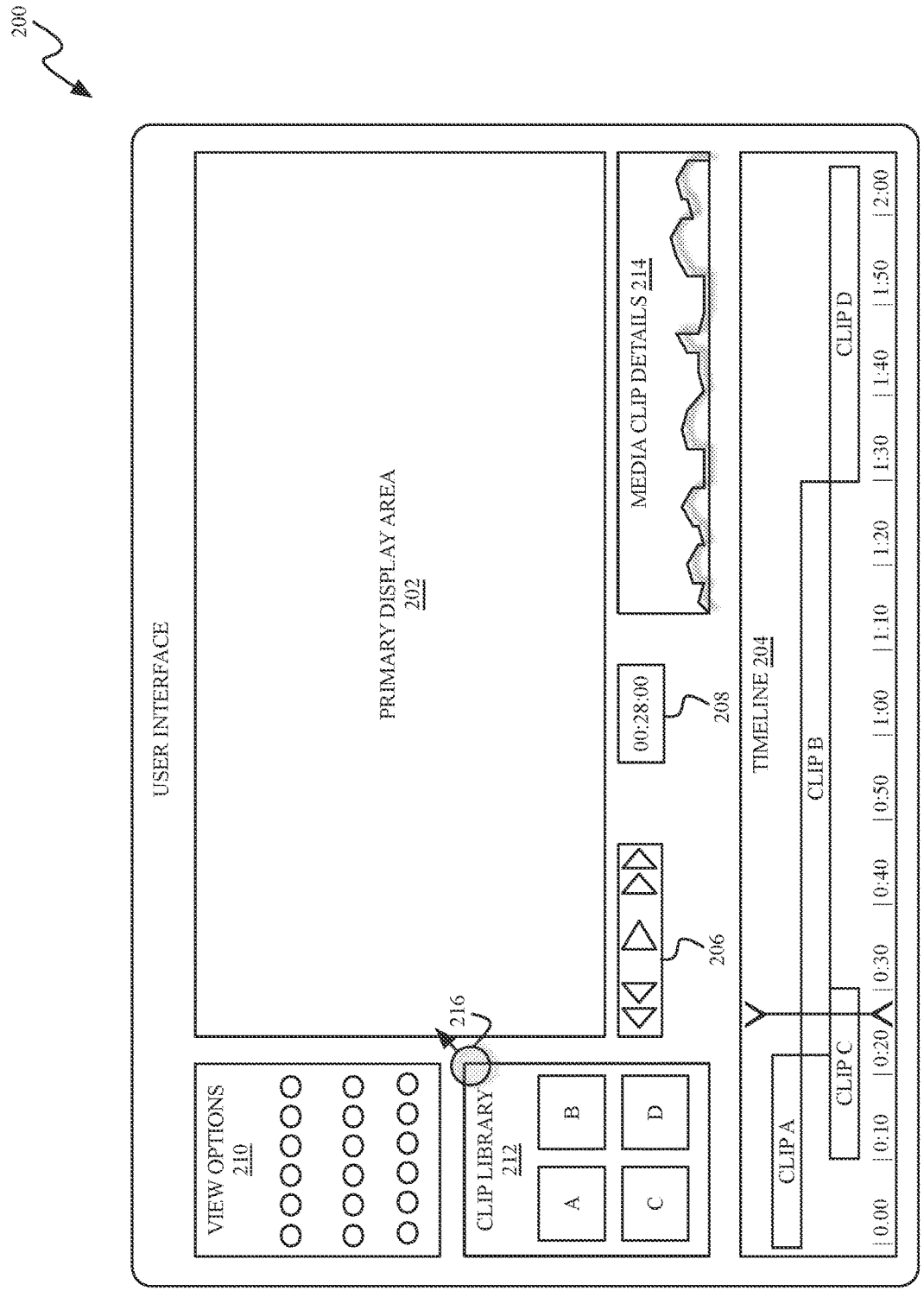
FIGS. 2A-2D illustrate example user interfaces having a set of user-adjustable display areas.

FIGS. 2A-2D illustrate example user interfaces having a set of user-adjustable display areas. FIG. 2A shows user interface 200, which includes the following user-adjustable display areas: a primary display area 202, a timeline 204, play controls 206, a time indicator 208, view options 210, a media clip library 212, and media clip details 214. Although these user-adjustable display areas are shown and described, any number and type of user-adjustable display areas may be included in various implementations. The primary display area 202, in one approach, displays and/or plays back a media composition, which may be generated based on any number of individual media clips.

In one embodiment, the timeline 204 allows easy manipulation of the current playback time by adjusting a position of the playback head indicator along a timescale. The timeline 204 further displays how the media composition has been assembled by showing each media clip within the media composition positioned along the timeline 204 from a starting time to an ending time for the respective media clip. Moreover, each of these clips may be movable along the timeline 204, such as by a drag-and-drop touch input via a touchscreen display, to reposition the clips within the media composition.

For example, clip A starts at time 0:00 and ends at time 0:21 (a span of 21 seconds), clip B starts at time 0:21 and ends at time 1:30 (a span of 69 seconds), clip C starts at time 0:10 and ends at time 0:30 (a span of 20 seconds), and clip D starts at time 1:30 and may extend beyond the current timescale shown on the timeline 204.

The actual media content of clip A, clip B, clip C, and clip D may have originated from any source available in user interface 200, in one or more embodiments. Moreover, any of the media clips may represent audio-only, video-only, or audio-video portions from a source media clip.

In one embodiment, playback in the primary display area 202 may be time-synchronized to a time associated with the playhead indicator movable along the timeline 204. A user may manipulate playhead indicator to choose which portion and/or exact frame of media to display in the primary display area 202.

The playback controls 206 may include selectable graphical elements for controlling playback of media on the primary display area 202, such as play, pause, stop, skip ahead, skip back, etc. In one approach, user interface 200 may be implemented on a touchscreen display, and user input to the playback controls 206 may be received via finger touch input, stylus touch input, and/or hover input.

A hover user input occurs when a user hovers close to the touchscreen display within a threshold distance that is detectable by the touchscreen display, but does not actually contact the touchscreen display. A hover user input may cause a different action to be taken versus a touch contact. Moreover, swipe inputs and multiple tap inputs may also be received via the touchscreen display and may result in different actions to be taken versus a single touch contact.

The time indicator 208 shows the current time of playback for media shown in the primary display area 202. This time indicator 208 may be synchronized with the playback head indicator shown in the timeline 204. In some embodiments, the time indicator 208 may be selectable to change the time that is displayed by the time indictor 208 between an elapsed time, a remaining time, a total time, a time associated with a certain media clip, etc.

The view options 210 allow a user to select options for viewing media in the primary display area 202 and/or how the interface 200 is displayed. Some example view options include, but are not limited to, full screen, minimize, maximize, color selection, background selection, size options, priority of display, selection of one or more effects to apply to the media displayed in primary display area 202, etc. In one approach, different view options for different portions of the user interface 200 may be shown in different display areas.

Some example effects that can be applied include, but are not limited to, altering the speed (e.g., slow-motion or fast-motion), filter application (e.g., blur, black-and-white, drawing effect, color enhancing, color altering or reversal, sharpening, softening, etc.), sound manipulation (e.g., enhancing the sound, amplifying sounds within a selected range, deadening sounds within a selected range, loudness alteration, etc.), jitter reduction, motion smoothing, unwanted object removal, etc.

In one embodiment, the priority of display may dictate which display area is shown in any given layout in order of preference (e.g., primary display area 202 will be displayed instead of the media clip details 214 when the primary display area 202 has a higher priority than the media clip details 214). once touch user input is received that changes a size of one of the user-adjustable display areas.

The media clip library 212 shows available media clips that may be added to a media composition. In FIG. 2A, the media clip library 212 shows four media clips A, B, C, and D, which are available for addition to the media composition. However, the number of media clips that are shown, and how they are displayed (e.g., thumbnail, widescreen, name, graphical representation or icon, etc.) depends on the size of the display area for the media clip library 212. In one approach, different media clip libraries may be shown in different display areas.

The media clip details 214 shows information about a media clip or the media composition. A user may select the media clip or media composition to show information about in one approach. In other approaches, media clip details 214 may show details for a media clip and/or media composition being displayed in the primary display area 202. In another approach, media clip details 214 may show details for a currently-selected media clip and/or media composition. In one approach, media clip details for different media may be shown in different display areas.

Some example details include, but are not limited to, name, date, length, mood, genre, size, a pictograph displaying one or more aspects of the media (audio level, video information, etc.), type of media, etc.

In an embodiment, user input may modify one or more media clips along the timeline 204. For example, modifications may include, but are not limited to, clipping a media clip to remove at least one portion of the media clip (e.g., making the media clip shorter in duration and removing content from an end), shrinking a media clip to condense content of the media clip during playback of the media clip (e.g., shrinking the duration of playback but not removing any content), expanding a media clip to stretch the content of the media clip during playback of the media clip (e.g., expanding the duration of playback without adding any content), etc.

In response to the modifications to the media clip(s), modified versions of the media clip(s) that indicate the changes will be shown in the timeline 204 in place of those shown previously.

According to one or more embodiments, touch user input may be received to modify a media clip on the timeline 204. An example touch user input may touch, hold, and drag an end of a media clip toward the other end of the media clip, thereby shortening the media clip in duration. Content will be removed from the media clip from the end which was touched. Alternatively, content in the media clip may be compressed.

Another example touch user input may touch, hold, and drag an end of a media clip away from the other end of the media clip, thereby elongating the media clip in duration. Content will be added to the media clip from the end which was touched, if such content is available. Otherwise, the content of the media clip may be stretched.

Another example touch user input may touch, hold, and drag the entire media clip in a particular direction (up, down, left, right). This movement of the media clip may cause the media clip to swap positions with another media clip in the timeline 204, in an approach. The movement may alternately cause the media clip to be moved to the new designated position along the timeline without swapping respective positions. In yet another approach, the movement may cause one or more other media clips to slide up, down, left, or right in lockstep with the amount and direction of movement of the media clip.

In one example touch input, a user may select a certain point in time within a media clip, which may cause the media clip to split at the selected point in time. Moreover, two media clips may be merged together based on a touch, drag, and release touch input that slides two media clips adjacent one another.

FIG. 2A shows a single touch input 216 that drags a corner of the media clip library 212 in an upward and rightward direction toward the primary display area 202. This single touch input indicates to resize the display area for the media clip library 212 (e.g., to grow in size). This resizing will impact the positioning and/or placement of one or more other display areas of interface 200, based on where the touch input 216 ends. Moreover, this resizing may change the content and amount of information that is displayed to not only the media clip library 212, but to any other display areas of interface 200 that change.

Figure 2B:
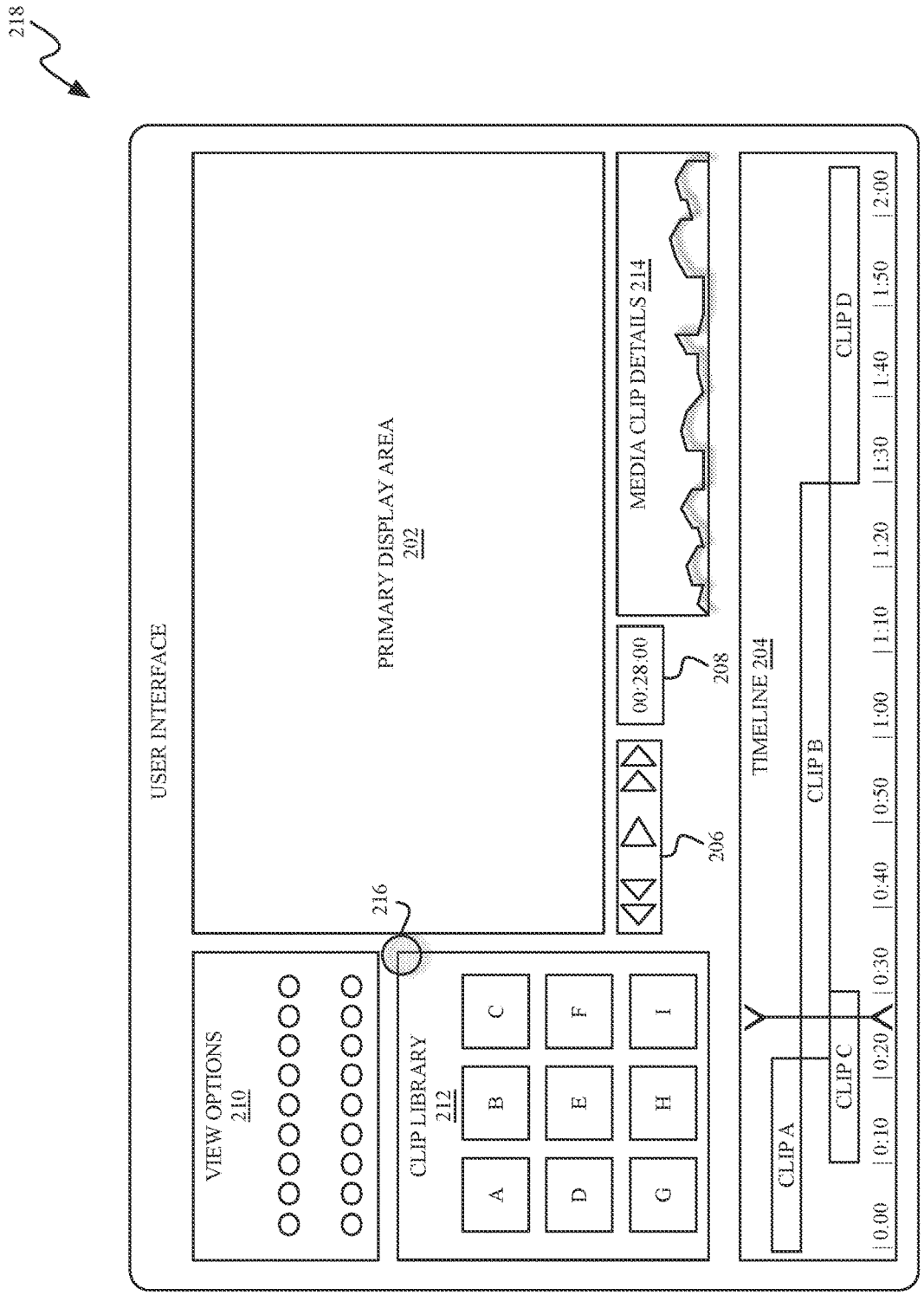

In FIG. 2B, example user interface 218 is shown that may result from the touch input 216. As shown, movement of the touch input 216 has ended in user interface 218. In response to the touch input 216 dragging the media clip library 212 to a larger size, several example changes have been made to user interface 200 to generate user interface 218.

One example change is the size of media clip library 212, which now extends the upper right corner thereof to the position where the touch input 216 ended. Moreover, another example change is a result of the additional space on media clip library 212 which allows for more media clips to be displayed (e.g., media clips A-D were shown in user interface 200, while media clips A-I are shown in interface 218). An example change that has been made is the expansion of the view options 210, elongating the display area to the right toward the primary display area 202.

Another example change is the reduction in size for the primary display area 202, which allows for expansion of the media clip library 212. Additional example changes involve the shifting of the positions for media controls 206 and time indicator 208 to the right to allow for expansion of the media clip library 212.

Although the above example changes were made to the other display areas as a result of the touch input 216 indicating a change in size of the media clip library 212, other possible changes could be made to the same, some, or different display areas than those shown in FIG. 2B, in various approaches.

Figure 2C:
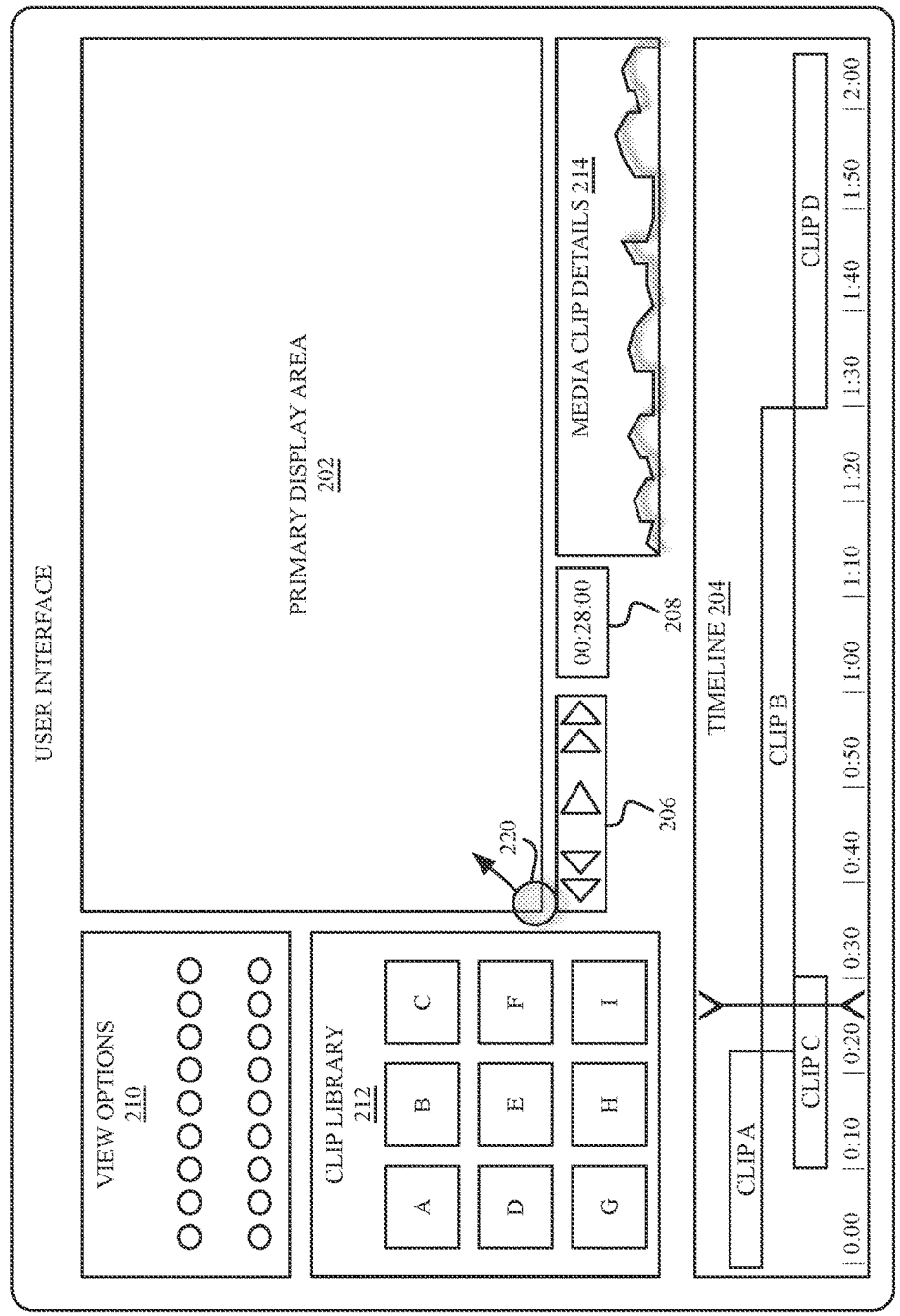

In FIG. 2C, another touch input 220 is shown on user interface 218 which reduces the size of the primary display area 202 in an upward and rightward direction from the lower left corner.

Figure 2D:
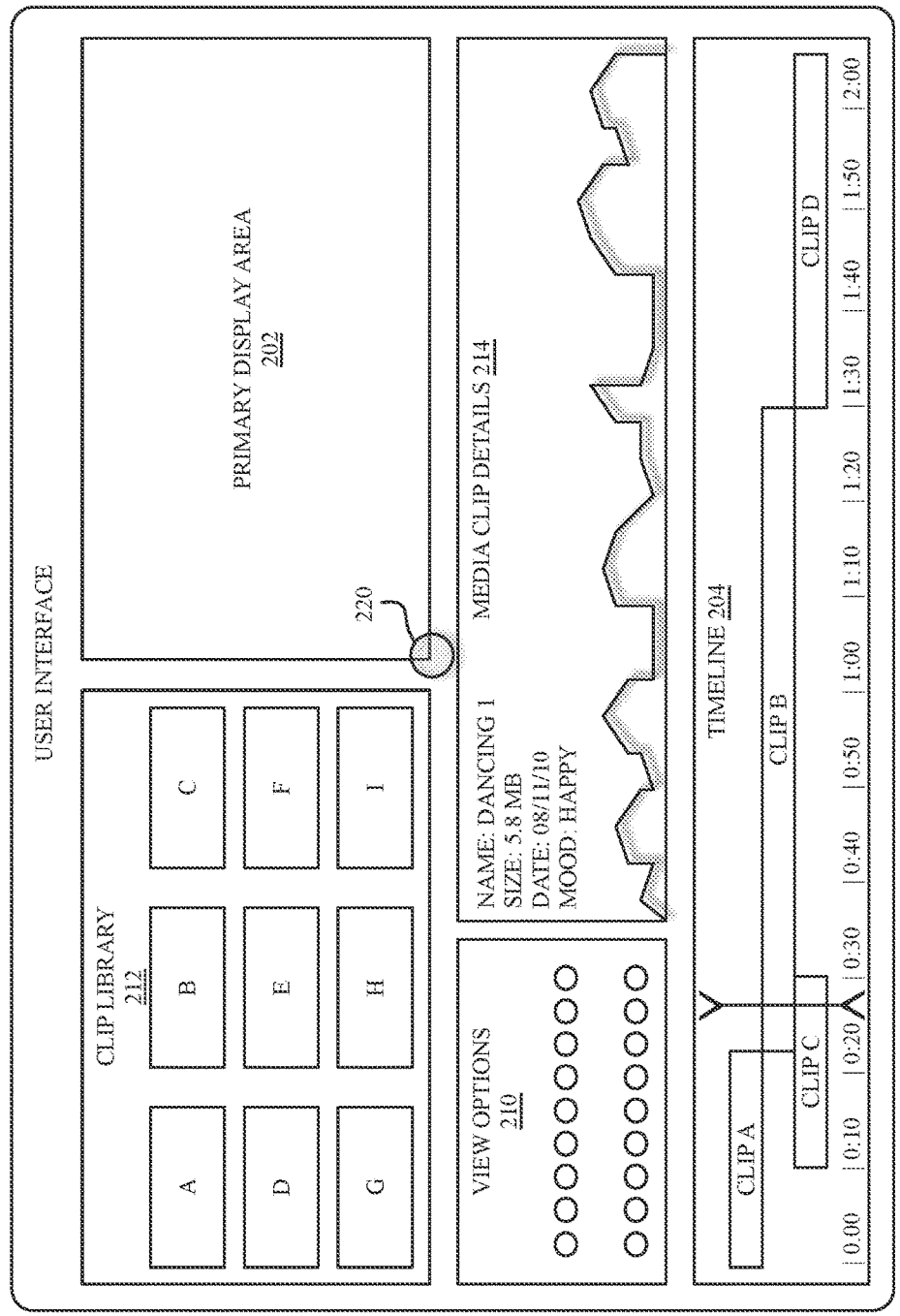

FIG. 2D shows an example user interface 222 that may result from the touch input 220. As shown, movement of the touch input 216 has ended in user interface 222. In response to the touch input 216 dragging the corner of the primary display area 202 inward to create a smaller display area, several example changes have been made to the display areas shown in user interface 218 to generate user interface 222.

An example change that has been made is the reduction in size of the primary display area 202, reducing the display area upward and inward from the lower left corner.

One example change is the increase in size and display of additional information in media clip details 214. Previously, in user interface 218, media clip details 214 showed a pictograph for a currently displayed portion of the media composition. In user interface 222, the pictograph remains but additional information about the currently displayed portion of the media composition is shown, e.g., name, size, date, and mood. Other possible information may be displayed in some approaches.

Another example change is a swap in position for the view options 210 and the media clip library 212. Additionally, an example change is the increase in size of the media clip library 212, allowing for larger individual representations of the various media clips A-I to be shown. Other possible changes could be made to display areas as a result of the touch input 216, and the changes shown are for example only.

Figure 3A:
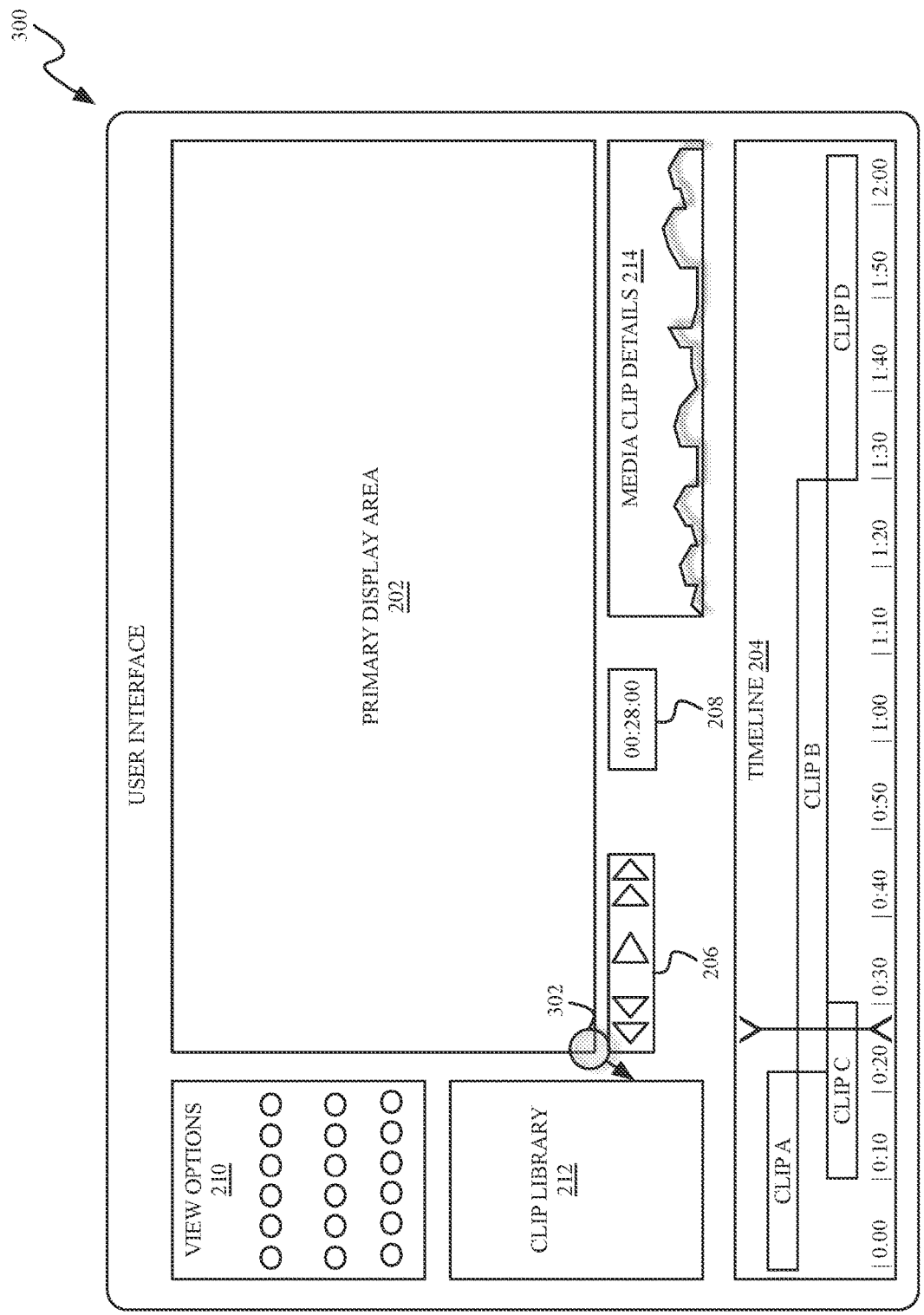
FIGS. 3A-3B illustrate example user interfaces having a set of user-adjustable display areas.
Figure 3B:
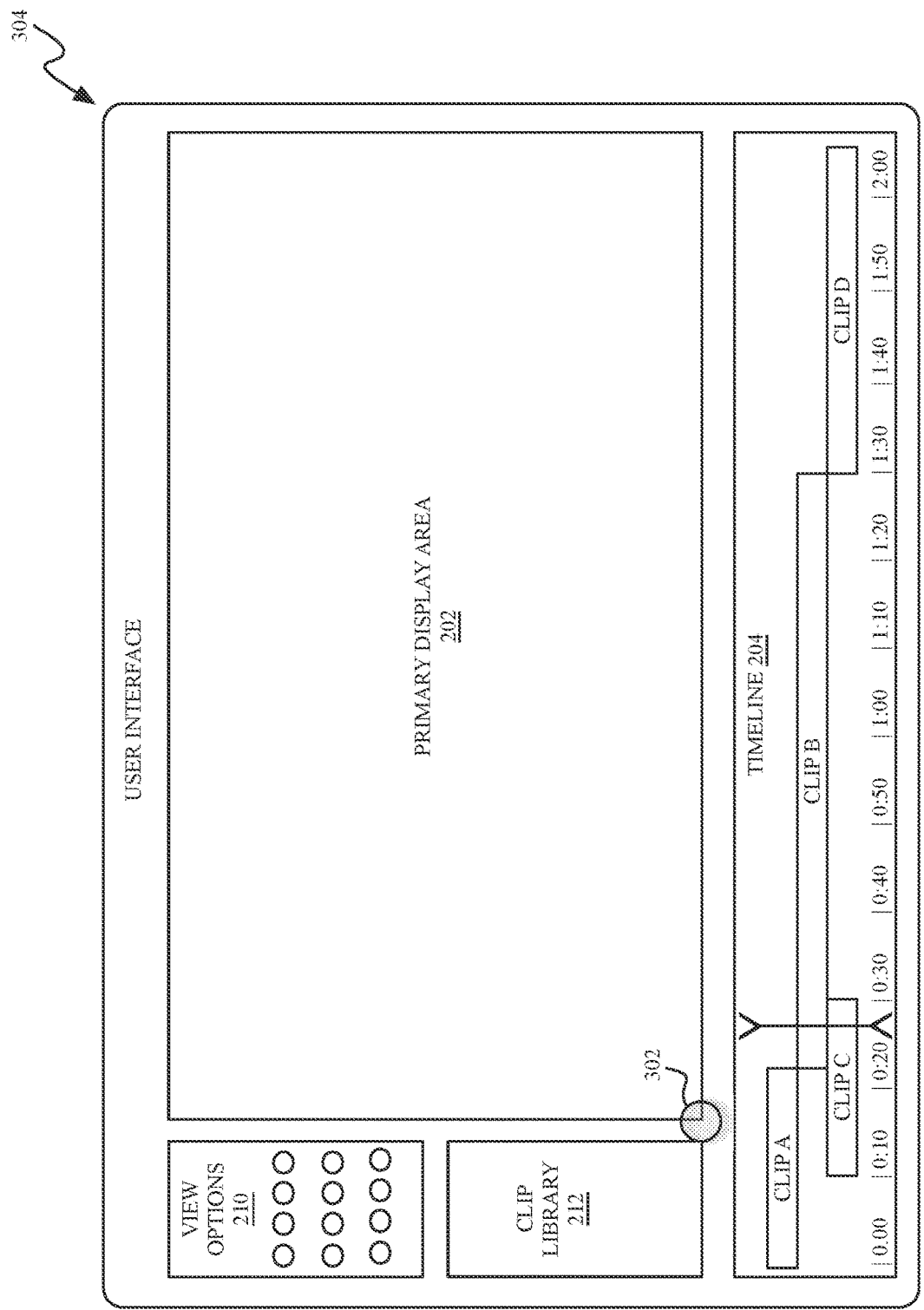

FIGS. 3A-3B illustrate example user interfaces having a set of user-adjustable display areas. FIG. 3A shows user interface 300 on which a single touch input 216 that drags a lower left corner of the primary display area 202 in a downward and leftward direction toward the media clip library 212 is received. This single touch input indicates a resizing of the primary display area 202 to grow in size, which will impact the positioning and/or placement of one or more other display areas of interface 300, based on where the touch input 302 ends.

In FIG. 3B, example user interface 304 may result from the touch input 302. Movement of the touch input 302 has ended in user interface 304. In response to the touch input 302 dragging the primary display area 202 to a larger size, several example changes have been made to user interface 300 to generate user interface 304.

One example change is the size of media clip library 212, which has shrunk in size in the horizontal dimension. Another example change is the reduction in size of the view options 210 in the horizontal dimension. Moreover, an example change is a result of the reduction in space on view options 210 which causes less options to be displayed for selection thereof. Moreover, an example change that has been made is expansion of the timeline 204, elongating the display area to the left.

Several other example changes are the removal of the playback controls 206 and time indicator 208 as a result of the change in positioning of the other display areas. Other possible changes could be made to display areas as a result of the touch input 302, and the changes shown are for example only.

Figure 4A:
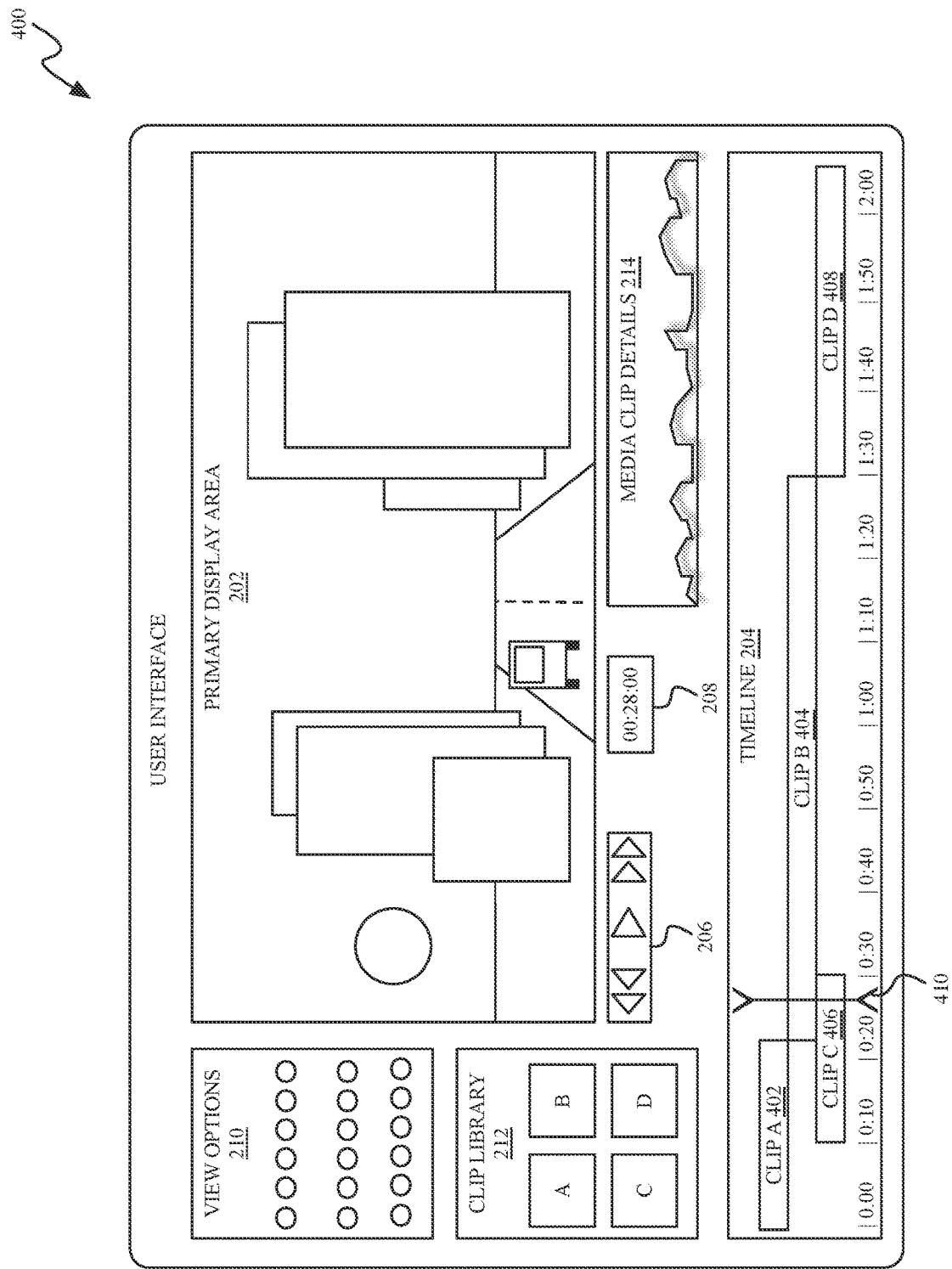
FIGS. 4A-4D show example user interfaces illustrating hover user input to modify the display of content.

FIGS. 4A-4D show example user interfaces illustrating hover user input to modify the display of content. FIG. 4A shows user interface 400, which includes various display areas including a primary display area 202, a timeline 204, play controls 206, a time indicator 208, view options 210, a media clip library 212, and media clip details 214. Although these display areas are shown, any number and type of display areas may be included in various implementations.

Timeline 204 displays four media clips: media clip A 402, media clip B 404, media clip C 406, and media clip D 408, arranged in the order shown on the timeline 204 to form a media composition. Playhead indicator 410 indicates a current playback position of the media composition (e.g., it indicates a currently displayed frame in the primary display area 202).

Figure 4B:
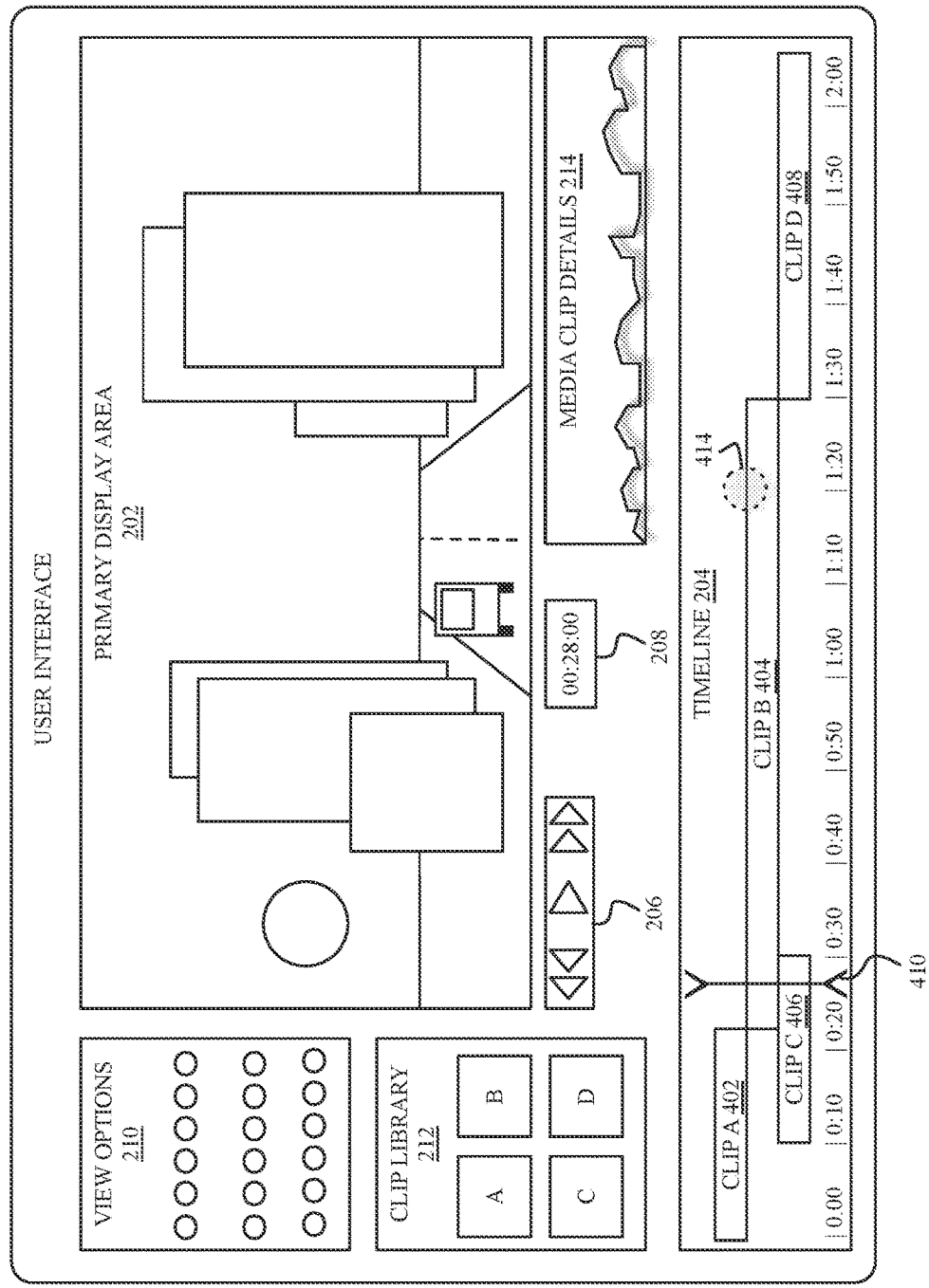
Figure 4C:
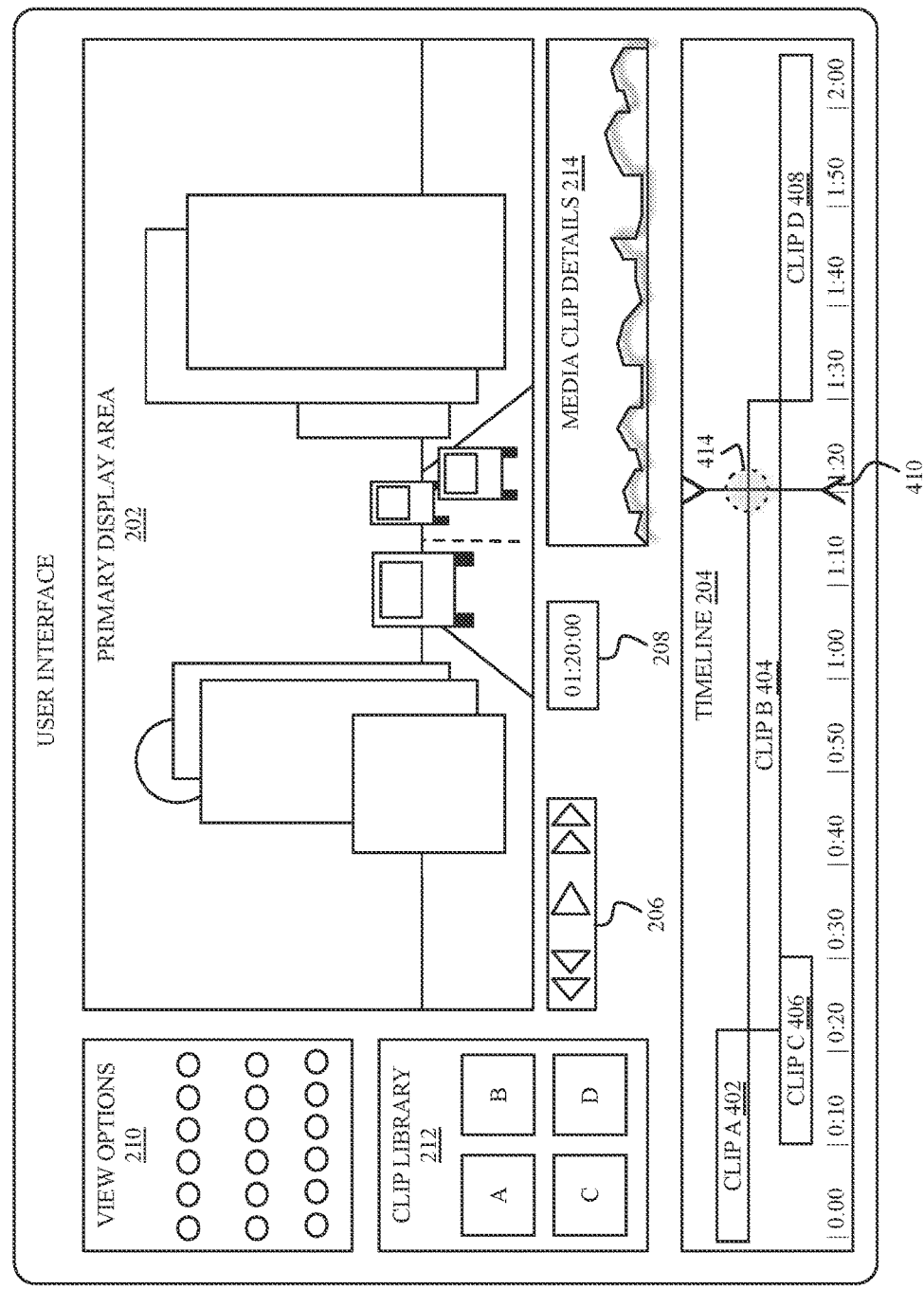

FIG. 4B shows user interface 412 where a user has provided a hover input 414 over a second position along the timeline 204. This second position corresponds to a second frame in the media composition. FIG. 4C shows user interface 416, where the second frame is displayed in the primary display area 202 as a result of the hover input 414 over the second position along the timeline 204. In one embodiment, the time indicator 208 may indicate the second frame in the media composition by displaying 1:20, along with the position of the playhead indicator 410 along the timeline 204 which corresponds to the second frame. In an alternate embodiment, one or both of the playhead indicator 410 and the time indicator 208 may continue to display the previous position and time, respectively, that correspond to the first frame of the media composition.

Figure 4D:
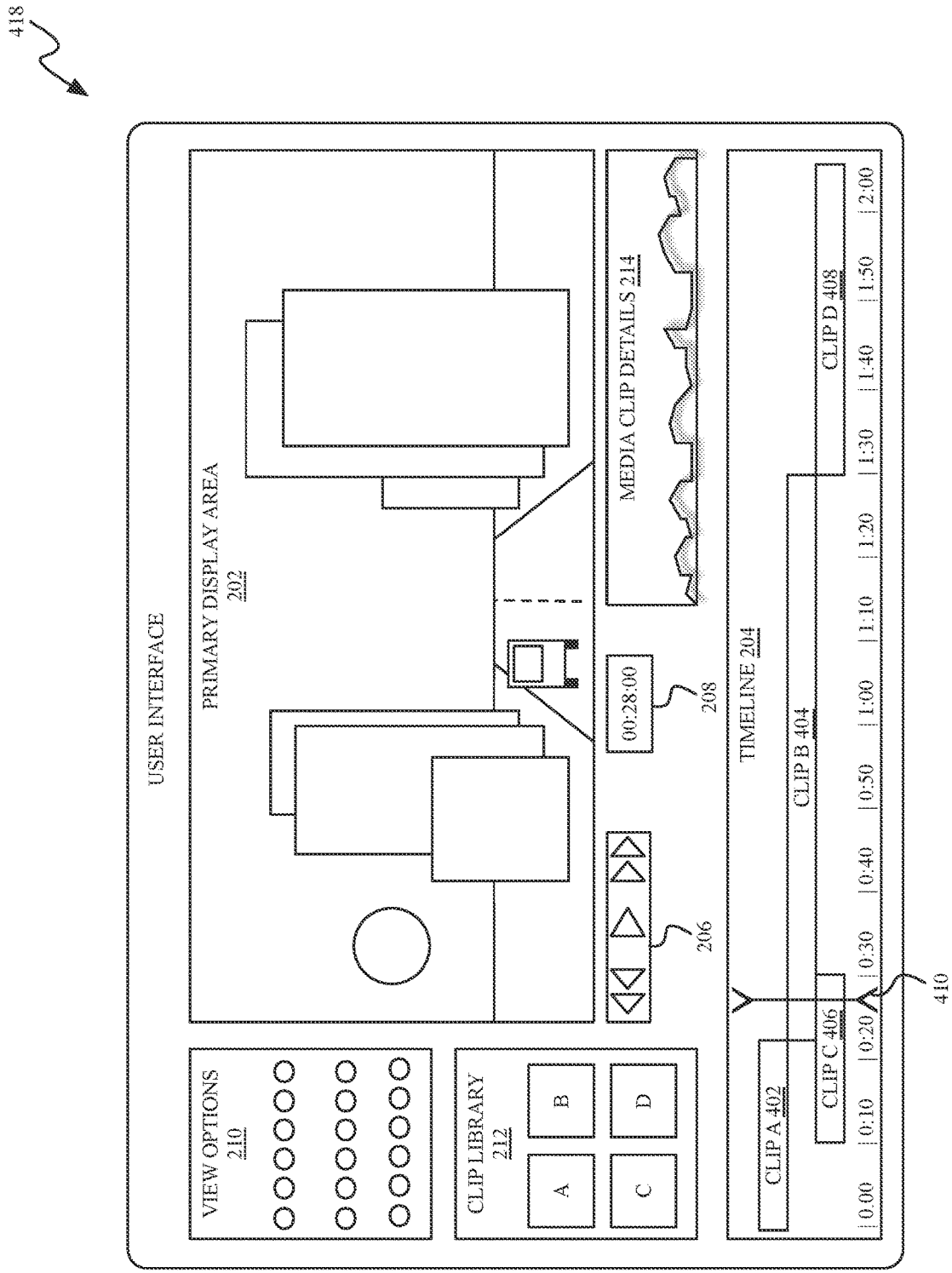

FIG. 4D shows user interface 418 after cessation of the hover input 414. Because the hover input has ended, the primary display area will resume display of the media composition at the first frame, indicated by the 28:00 mark on the time indictor 208 and the positioning of the playhead indicator 410 in the position prior to receiving the hover input 414. In this way, a user can preview a portion of the media composition using a hover input, without actually adjusting a position of the playhead indicator 410 and altering a frame being viewed in the media composition.

Figure 5A:
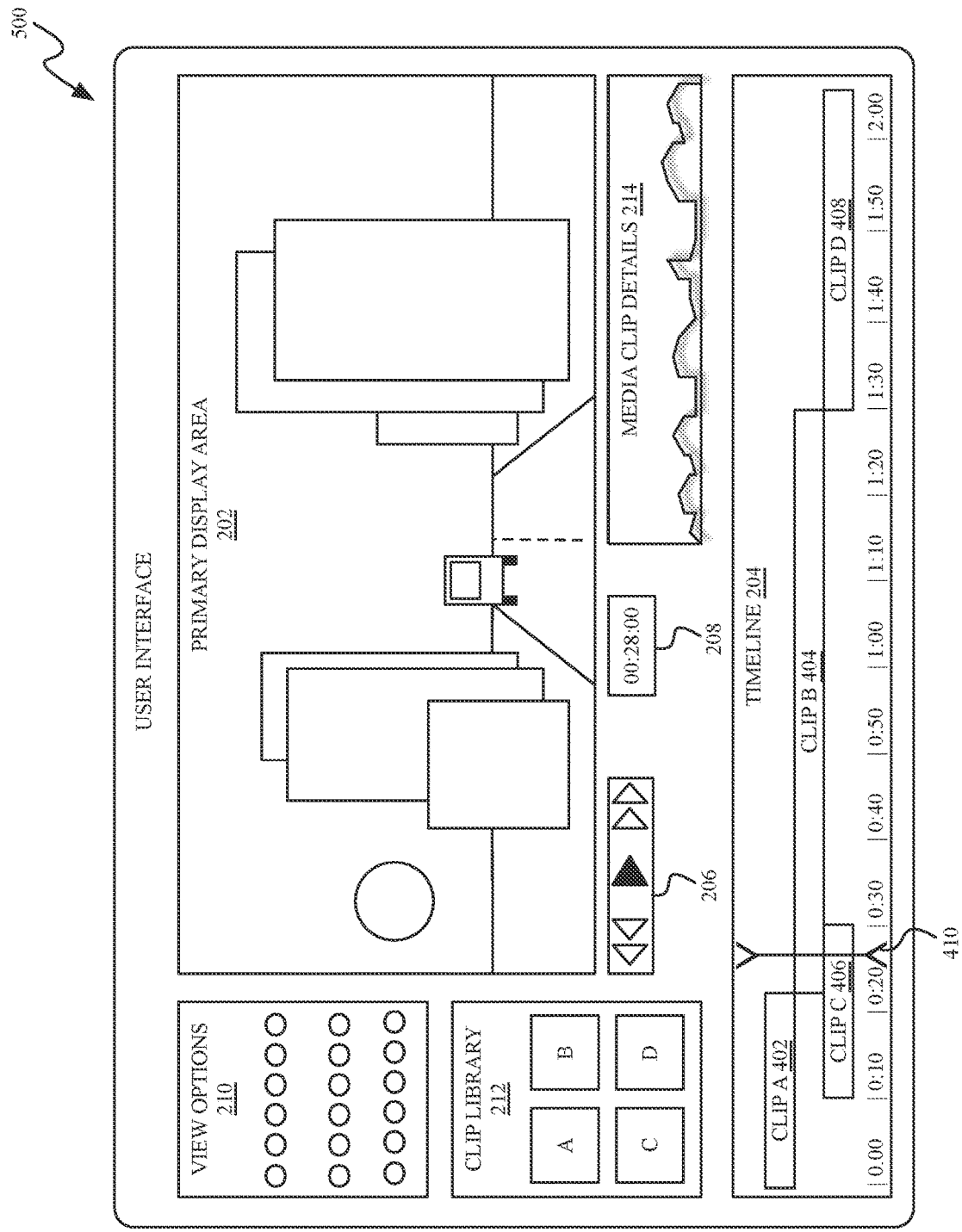
FIGS. 5A-5D show example user interfaces illustrating hover user input to modify the display of content.

FIGS. 5A-5D show example user interfaces illustrating hover user input to modify the display of content. FIG. 5A shows user interface 500, which includes various display areas including a primary display area 202, a timeline 204, play controls 206, a time indicator 208, view options 210, a media clip library 212, and media clip details 214. Although these display areas are shown, any number and type of display areas may be included in various implementations. The primary display area 202 is playing a media composition in this example, with the time being indicated as 28:00 in FIG. 5A and the play control being illuminated.

Figure 5B:
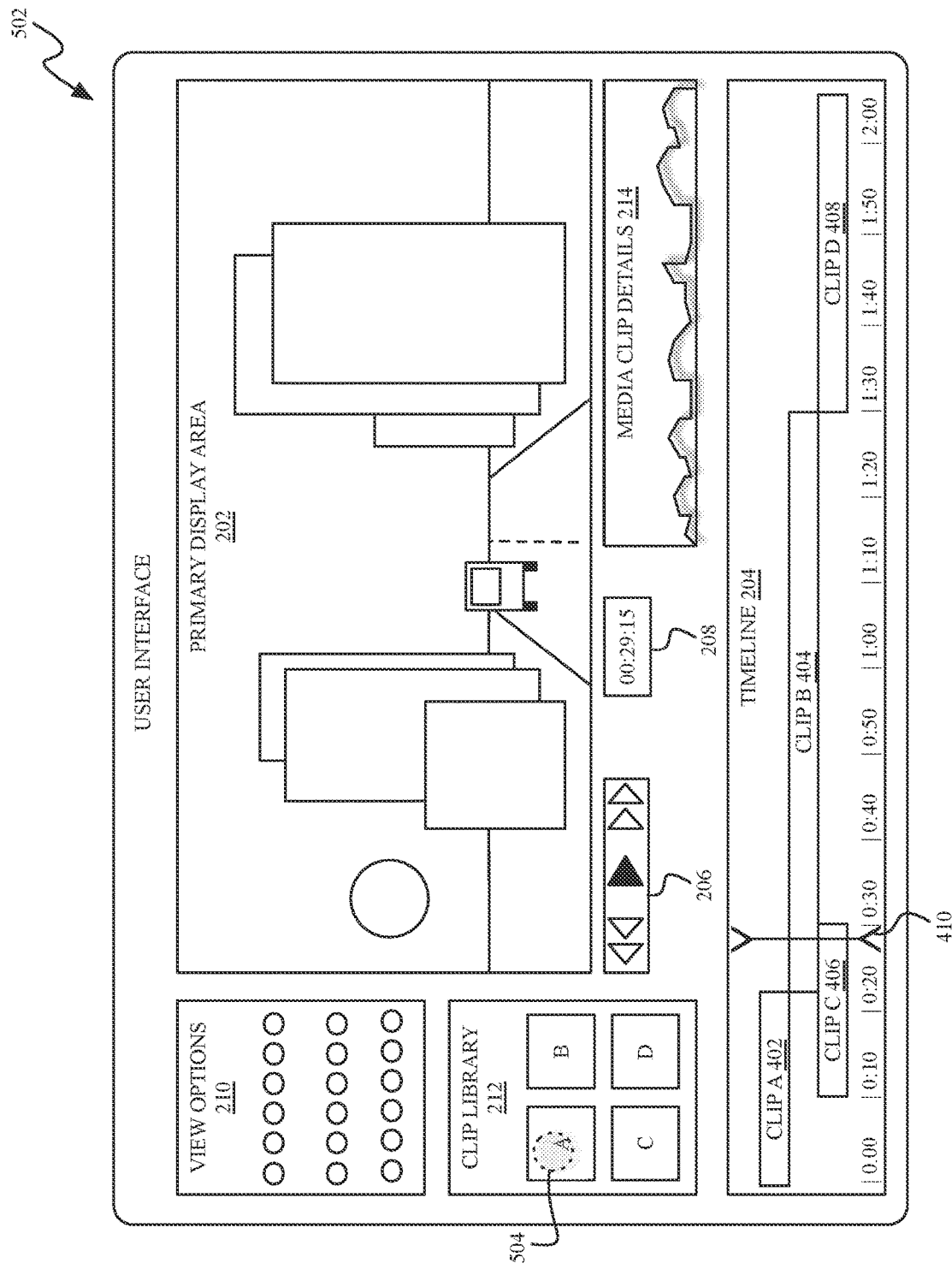

In FIG. 5B, user interface 502 shows that a user has provided a hover input 504 over a graphical representation of a second frame in the media composition (from media clip A 402 shown in the media clip library 212). This hover input 504 has been initiated at 29:15 of playback of the media composition, as indicated by the time indicator 208.

Figure 5C:
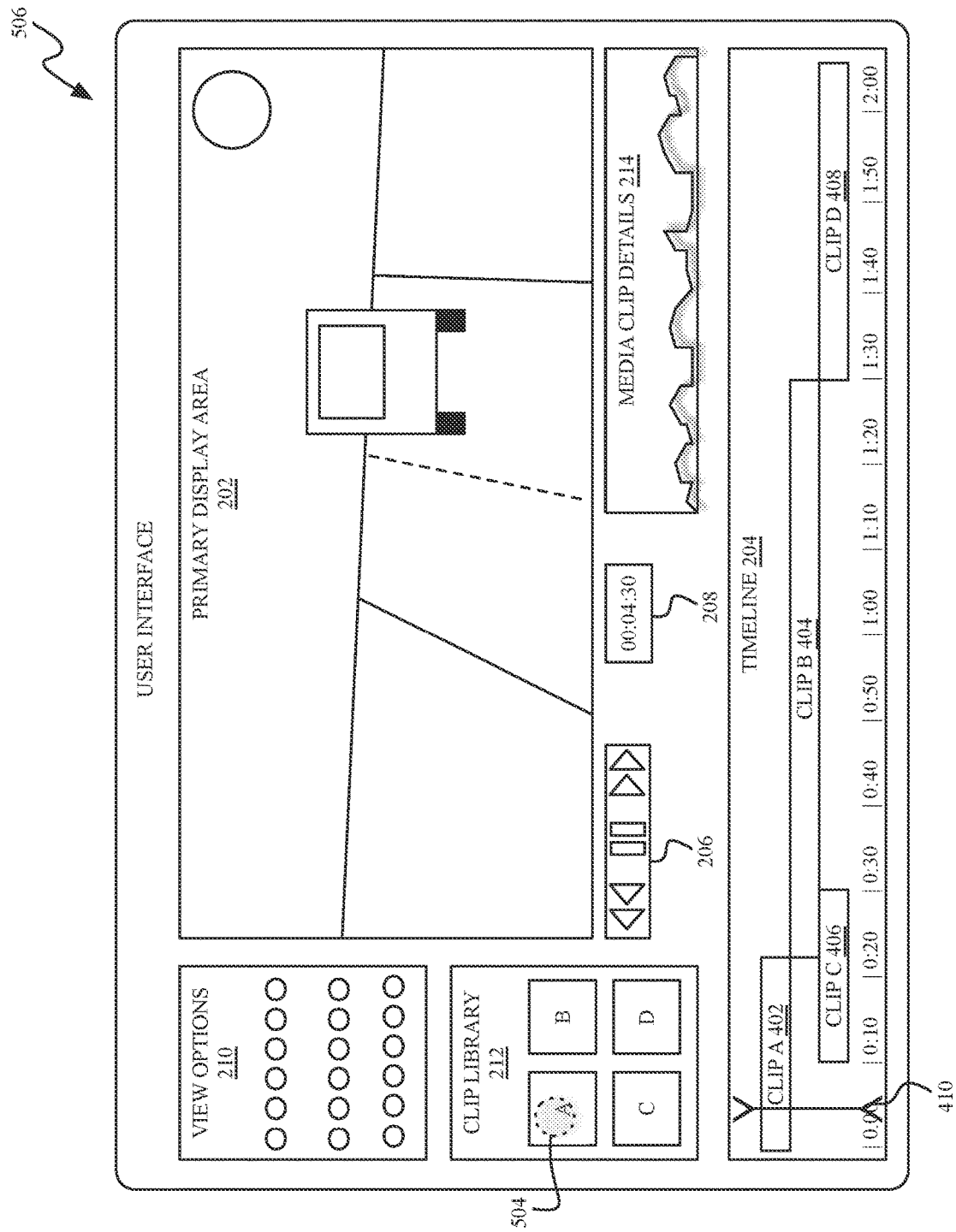

FIG. 5C shows user interface 506, where the second frame is displayed in the primary display area 202 as a result of the hover input 504 over the graphical representation of the second frame in the media composition. In one embodiment, the time indicator 208 may indicate the second frame in the media composition by displaying 4:30, along with the position of the playhead indicator 410 along the timeline 204 which corresponds to the second frame. In an alternate embodiment, one or both of the playhead indicator 410 and the time indicator 208 may continue to display the previous position and time, respectively, that correspond to the first frame of the media composition.

As long as the user maintains the hover input 504 over the graphical representation of the second frame in the media composition, primary display area 202 will continue to display the second frame. Moreover, in some approaches, moving the hover input 504 over a different position in the media composition will cause display of a frame corresponding to that different position to replace what is shown in the primary display area 202.

Figure 5D:
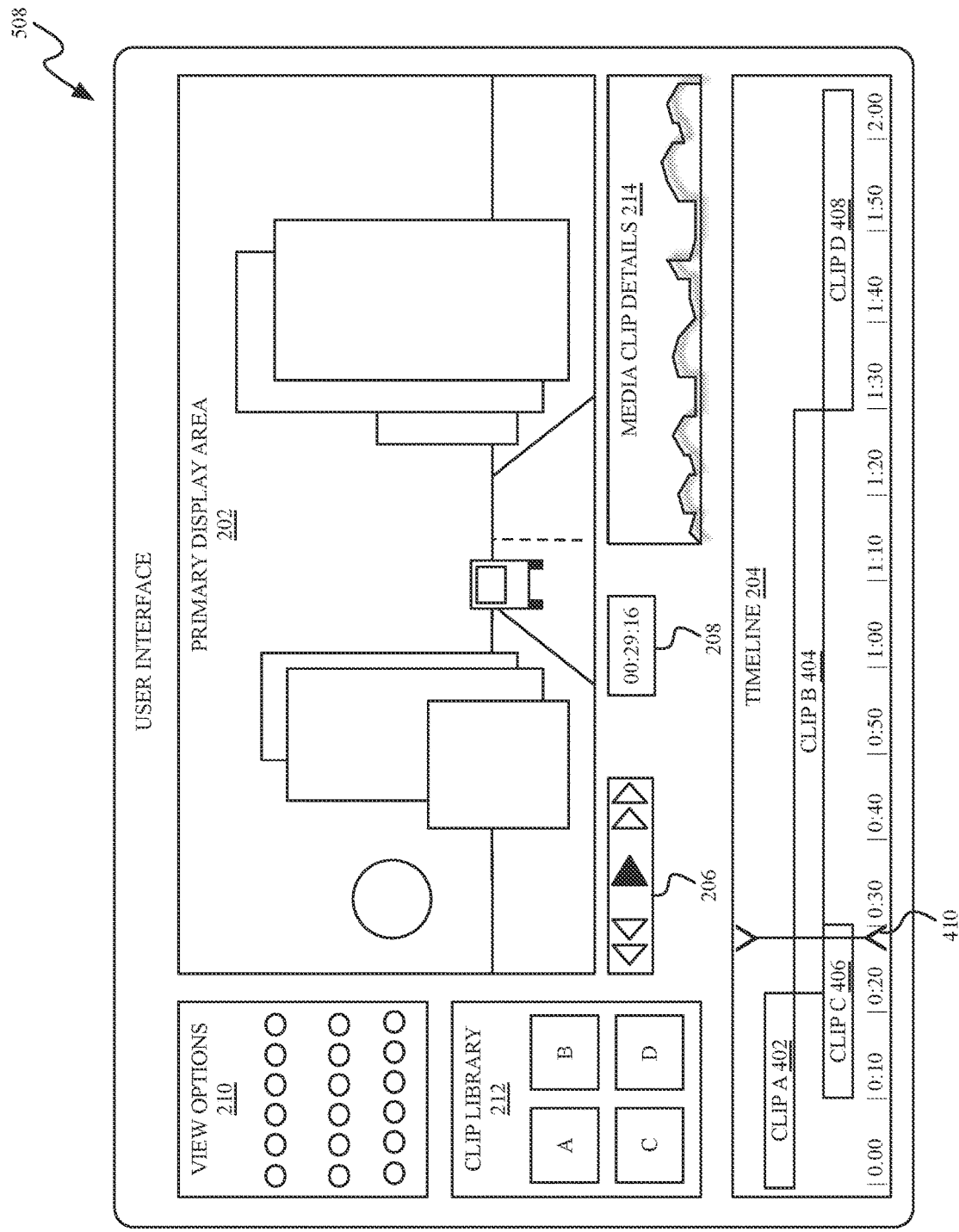

FIG. 5D shows user interface 508 after cessation of the hover input 504. Because the hover input 504 has ended, the primary display area will resume playback of the media composition subsequent to the first frame, indicated by the 29:16 mark on the time indictor 208 and the positioning of the playhead indicator 410 near the position prior to receiving the hover input 504. This allows a user to preview one or more frames of the media composition, or media clips available for the media composition, without actually adjusting the playhead indicator 410 and losing the previous playback position.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
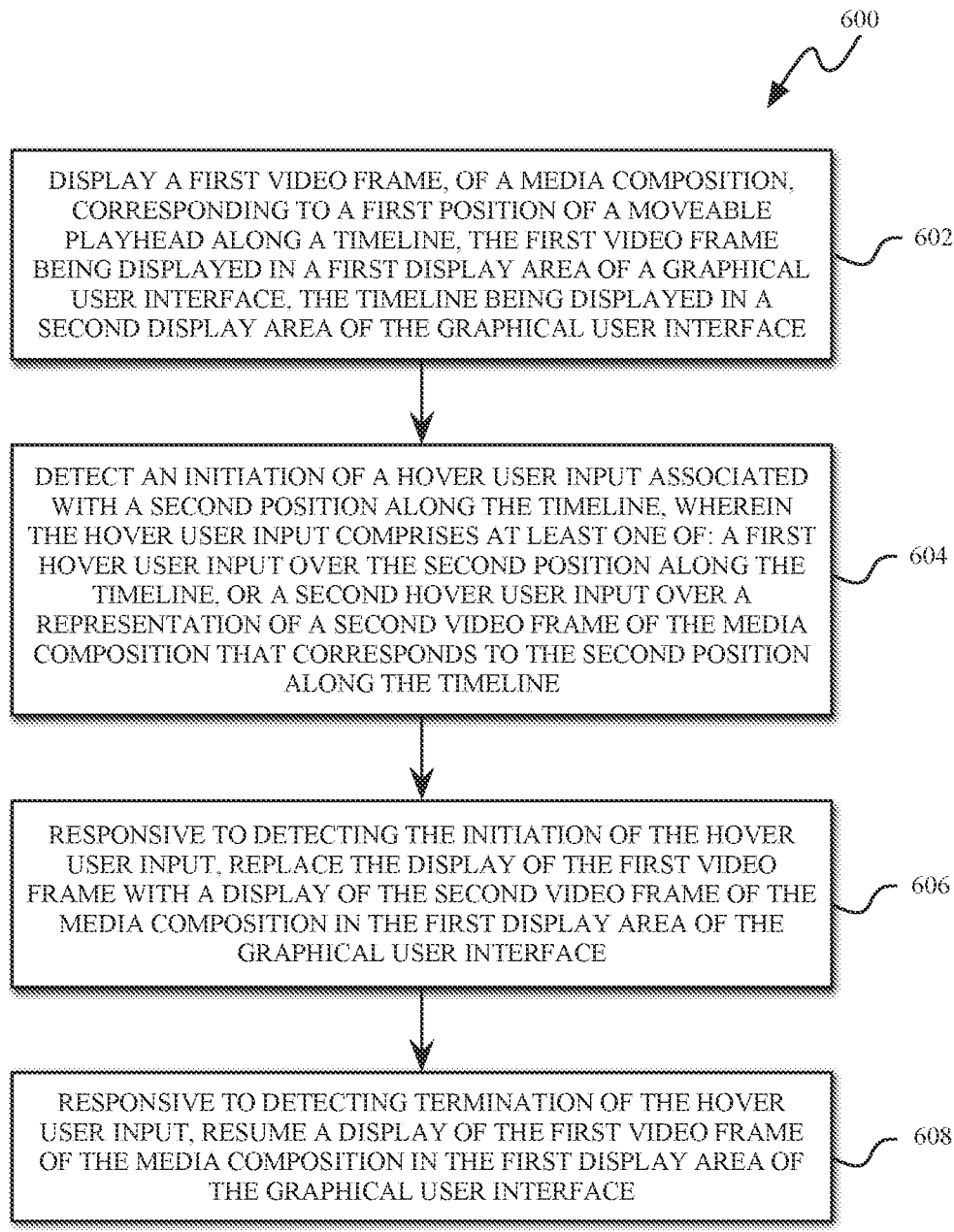
FIG. 6 is a flow diagram of an example process for modifying display of content based on a hover user input.

FIG. 6 is flow diagram of an example process 600 for modifying display of content based on a hover user input, in one or more embodiments. More or less operations than those shown and described herein may be included in process 600 in various approaches. For the remainder of the description of FIG. 6, process 600 will be described as being performed by a computing device having at least one hardware processor for performing the various operations.

In operation 602, the computing device displays a first video frame, of a media composition, corresponding to a first position of a moveable playhead along a timeline. The first video frame is displayed in a first display area of a GUI, while the timeline is concurrently displayed in a second display area of the GUI.

In an approach, the first video frame may be displayed during playback of the media composition. In this approach, as the media composition is being played back, a particular video frame of the media composition will be displayed according to the position of the moveable playhead along the timeline at any given moment in time.

In operation 604, the computing device detects an initiation of a hover user input associated with a second position along the timeline. The hover user input may be of any type that is detectable and able to be associated with the second position along the timeline. For example, the hover user input may be a hover user input that is positioned over the second position along the timeline, or a hover user input that is positioned over a representation of a second video frame of the media composition that corresponds to the second position along the timeline. This representation may be a thumbnail, icon, or some other indicator that represents the second position within the media composition.

In an embodiment, the initiation of the hover user input associated with the second position along the timeline may be detected based on a position of a user input position being unchanged for a threshold period of time (e.g., hovering over the position for a period of time without touching the touchscreen display).

In one approach, the initiation of the hover user input associated with the second position along the timeline may be detected based on a user's finger or touch input device being less a threshold distance from a touchscreen display without contacting the touchscreen display.

In operation 606, responsive to detecting the initiation of the hover user input, the computing device replaces the display of the first video frame with a display of the second video frame of the media composition in the first display area of the graphical user interface.

In one embodiment, the computing device may detect the initiation of the hover user input associated with the second position along the timeline based on a user hovering over a particular media clip from the media composition to select the particular media clip for previewing in the first display area of the GUI.

In an approach, the second video frame may be displayed during playback of a portion of the media composition that begins with the second video frame. In this approach, playback of the portion of the media composition that begins with the second video frame is initiated in response to detecting the hover user input associated with the second position along the timeline.

In operation 608, responsive to detecting termination of the hover user input, the computing device resumes a display of the first video frame of the media composition in the first display area of the graphical user interface.

In an approach, the computing device may resume the display of the first video frame by resuming playback of a portion of the media composition preceded by the first video frame and continuing to playback the media composition from this point forward.

In one or more embodiments, the computing device may detect an initiation of a subsequent hover user input associated with a third video frame. The subsequent hover user input may be of any type that indicates the third video frame. For example, the subsequent hover user input may be located over a third position along the timeline associated with the third video frame, located over a representation of a media clip that corresponds to the third video frame, etc. Responsive to detecting the initiation of the subsequent hover user input, the computing device will replace the display of the second video frame with a display of the third video frame in the first display area of the GUI.

In one approach, the representation of the second video frame is from a media clip displayed in a third display area of the GUI. In this approach, the media composition includes at least a portion of the media clip and the user hovers over the representation of the media clip to select a frame in the media composition that corresponds to the media clip.

Figure 7:
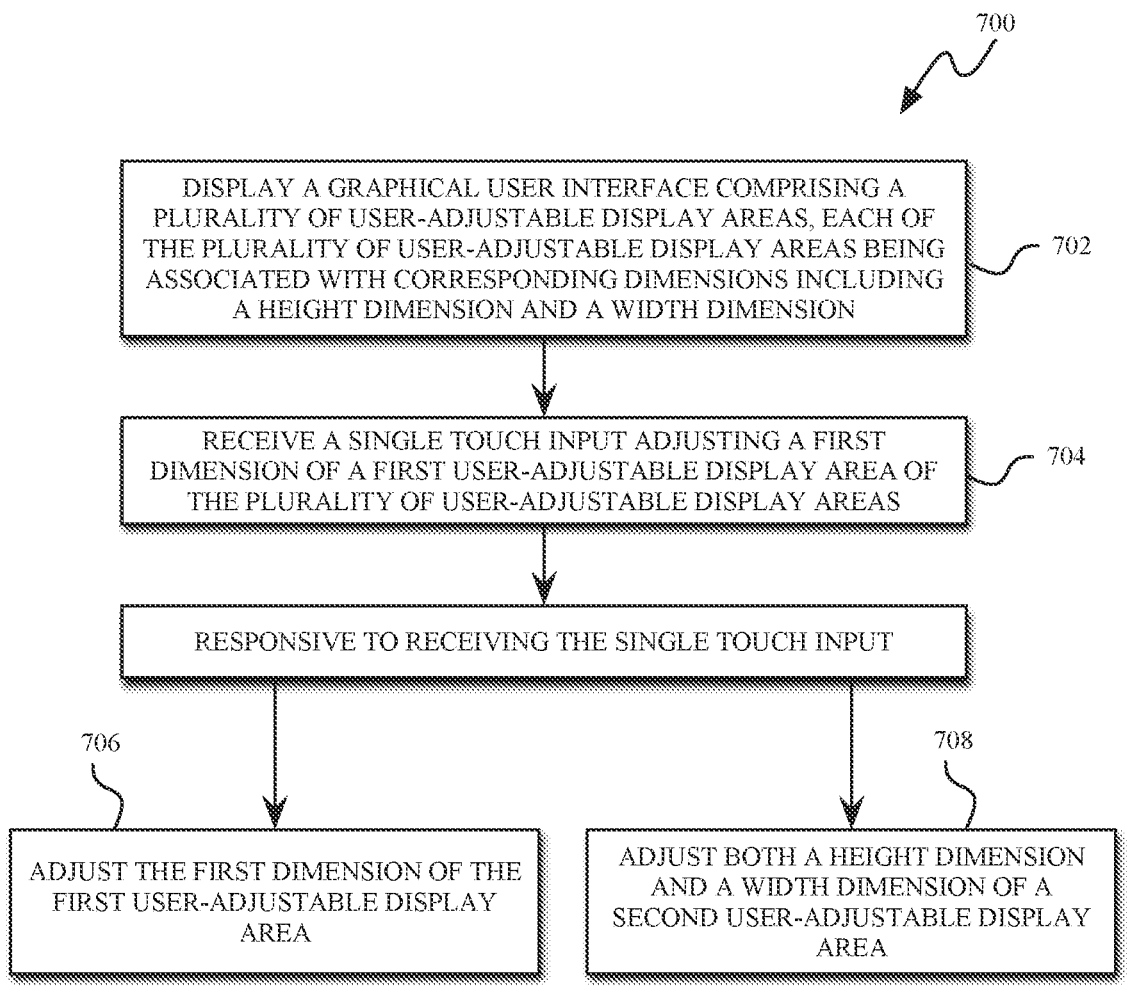
FIG. 7 is a flow diagram of an example process for modifying a user interface layout based on touch input.

FIG. 7 is flow diagram of an example process 700 for modifying a user interface layout based on touch input, in one or more embodiments. More or less operations than those shown and described herein may be included in process 700 in various approaches. For the remainder of the description of FIG. 7, process 700 will be described as being performed by a computing device having at least one hardware processor for performing the various operations.

In operation 702, the computing device displays a GUI that includes a plurality of user-adjustable display areas. Each of the plurality of user-adjustable display areas are associated with corresponding dimensions including a height dimension and a width dimension.

In operation 704, the computing device receives a single touch input adjusting a first dimension of a first user-adjustable display area of the plurality of user-adjustable display areas.

In an approach, the single touch input may include a click and drag user input that moves an edge of the first user-adjustable display area to increase or decrease a size of the display area.

According to another approach, the single touch input may be a swipe input. In one embodiment, the swipe input may begin on a portion of the particular user-adjustable display area and end at an edge of the GUI or outside of an area of the GUI or touchscreen display. This swipe input may indicate minimizing, shrinking, removing, or closing the particular user-adjustable display area in various approaches. In another embodiment, the swipe input may begin at an edge of the GUI or outside of the area of the GUI or touchscreen display and end at a location within the GUI. This swipe input may indicate opening, revealing, maximizing, or growing the particular user-adjustable display area in various approaches.

Operations 706 and 708 are performed responsive to receiving the single touch input. In operation 706, the computing device adjusts the first dimension of the first user-adjustable display area.

In operation 708, the computing device adjusts both a height dimension and a width dimension of a second user-adjustable display area.

In one embodiment, the plurality of user-adjustable display areas fully cover a particular region of the graphical user interface. In this embodiment, the computing device computes an adjustment of the height dimension and the width dimension of the second user-adjustable display area such that subsequent to the adjustment, the particular region of the graphical user interface remains fully covered by the plurality of user-adjustable display areas.

In one or more approaches, the computing device may also modify a layout of the plurality of user-adjustable display areas responsive to receiving the single touch input.

In one approach, the computing device may swap a horizontal position of the second user-adjustable display area in relation to a third user-adjustable display area. In this approach, the vertical dimension of the second user-adjustable display area may be different than a vertical dimension of the third user-adjustable display area. This difference in vertical dimensions may be a factor in the decision to modify the layout.

In another approach, the computing device may swap a vertical position of the second user-adjustable display area in relation to a third user-adjustable display area. In this approach, the horizontal dimension of the second user-adjustable display area may be different than a horizontal dimension of the third user-adjustable display area. This difference in horizontal dimensions may be a factor in the decision to modify the layout.

In adjusting both the height dimension and the width dimension of the second user-adjustable display area, the computing device may increase a size of the second user-adjustable display area according to one embodiment. Adjusting both the height dimension and the width dimension of the second user-adjustable display area may decrease a size of the second user-adjustable display area in another embodiment. In yet another embodiment, adjusting both the height dimension and the width dimension of the second user-adjustable display area may remove the second user-adjustable display area from display on the GUI, essentially making these dimensions zero.

In a further embodiment, the computing device may adjust a height dimension, a width dimension, or both for a third user-adjustable display area responsive to receiving the single touch input.

In one or more embodiments, responsive to receiving the single touch input, the computing device may modify a layout of the set of user-adjustable display areas from row-based to column-based, or from column-based to row-based. In some approaches, portions of the GUI may be changed from row-based to column-based, or from column-based to row-based to enable more effective display for the information included in the plurality of user-adjustable display areas.

In an approach, one or more display areas of the GUI may not be user adjustable. In this approach, the computing device will compute layout changes for displaying the user-adjustable display areas that avoid changing the positioning and size of any non-adjustable display areas being displayed in the GUI.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

User-Adjustable Display Areas

In various embodiments user-adjustable display areas may be manipulated using touch input as described below.

1. A non-transitory computer readable medium comprising one or more sequences of instructions which, when executed by one or more processors, cause the one or more processors to perform operations comprising:
   displaying a graphical user interface comprising a plurality of user-adjustable display areas, each of the plurality of user-adjustable display areas being associated with corresponding dimensions including a height dimension and a width dimension;
   receiving a single touch input adjusting a first dimension of a first user-adjustable display area of the plurality of user-adjustable display areas;
   responsive to receiving the single touch input:
   adjusting the first dimension of the first user-adjustable display area; and
   adjusting both a height dimension and a width dimension of a second user-adjustable display area.

2. The non-transitory computer readable medium as recited in claim 1, wherein the plurality of user-adjustable display areas fully cover a particular region of the graphical user interface.

3. The non-transitory computer readable medium as recited in claim 2, wherein the operations further comprise:
   computing an adjustment of the height dimension and the width dimension of the second user-adjustable display area such that subsequent to the adjustment, the particular region of the graphical user interface remains fully covered by the plurality of user-adjustable display areas.

4. The non-transitory computer readable medium as recited in claim 1, wherein the operations further comprise:
   further responsive to receiving the single touch input, modifying a layout of the plurality of user-adjustable display areas to swap a horizontal position of the second user-adjustable display area in relation to a third user-adjustable display area.

5. The non-transitory computer readable medium as recited in claim 4, wherein the vertical dimension of the second user-adjustable display area is different than a vertical dimension of the third user-adjustable display area, and wherein the layout is modified based on the vertical dimension of the second user-adjustable display area and the vertical dimension of the third user-adjustable display area.

6. The non-transitory computer readable medium as recited in claim 1, wherein the operations further comprise:
   further responsive to receiving the single touch input, modifying a layout of the plurality of user-adjustable display areas to swap a vertical position of the second user-adjustable display area in relation to a third user-adjustable display area.

7. The non-transitory computer readable medium as recited in claim 6, wherein the horizontal dimension of the second user-adjustable display area is different than a horizontal dimension of the third user-adjustable display area, and wherein the layout is modified based on the horizontal dimension of the second user-adjustable display area and the horizontal dimension of the third user-adjustable display area.

8. The non-transitory computer readable medium as recited in claim 1, wherein adjusting both the height dimension and the width dimension of the second user-adjustable display area increases a size of the second user-adjustable display area.

9. The non-transitory computer readable medium as recited in claim 1, wherein adjusting both the height dimension and the width dimension of the second user-adjustable display area decreases a size of the second user-adjustable display area.

10. The non-transitory computer readable medium as recited in claim 1, wherein the single touch input comprises a click and drag user input moving an edge of the first user-adjustable display area.

11. The non-transitory computer readable medium as recited in claim 1, wherein adjusting both the height dimension and the width dimension of the second user-adjustable display area removes the second user-adjustable display area from the graphical user interface.

12. The non-transitory computer readable medium as recited in claim 1, wherein the operations further comprise:
responsive to receiving the single touch input, adjusting, for a third user-adjustable display area, at least one of: a height dimension and a width dimension.

13. The non-transitory computer readable medium as recited in claim 1, wherein the operations further comprise:
responsive to receiving the single touch input, modifying a layout of the plurality of user-adjustable display areas from row-based to column-based.

14. The non-transitory computer readable medium as recited in claim 1, wherein the operations further comprise:
responsive to receiving the single touch input, modifying a layout of the plurality of user-adjustable display areas from column-based to row-based.

15. A system comprising:
one or more processors; and
a non-transitory computer readable medium comprising one or more sequences of instructions which, when executed by the one or more processors, cause the one or more processors to perform operations comprising:

displaying a graphical user interface comprising a plurality of user-adjustable display areas, each of the plurality of user-adjustable display areas being associated with corresponding dimensions including a height dimension and a width dimension;

receiving a single touch input adjusting a first dimension of a first user-adjustable display area of the plurality of user-adjustable display areas;

responsive to receiving the single touch input:
adjusting the first dimension of the first user-adjustable display area; and
adjusting both a height dimension and a width dimension of a second user-adjustable display area.

16. A method comprising:

displaying a graphical user interface comprising a plurality of user-adjustable display areas, each of the plurality of user-adjustable display areas being associated with corresponding dimensions including a height dimension and a width dimension;

receiving a single touch input adjusting a first dimension of a first user-adjustable display area of the plurality of user-adjustable display areas;

responsive to receiving the single touch input:
adjusting the first dimension of the first user-adjustable display area; and
adjusting both a height dimension and a width dimension of a second user-adjustable display area.

Privacy

As described above, one aspect of the present technology is the gathering and use of data available from various sources to improve the touch input analysis and display modification services. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for touch input analysis and display modification based on user preferences gleaned from the personal information data. Accordingly, use of such personal information data enables users to control how the touch input analysis and display modification services change the user experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of touch input analysis and display modification services, the present technology can be configured to allow users to select to "opt in" or "opt out" of participation in the collection of personal information data during registration for services or anytime thereafter. In another example, users can select not to provide mood-associated data for touch input analysis and display modification services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, touch input analysis and display modification may be based on non-personal information data or a bare minimum amount of personal information, such as the content being requested by the device associated with a user, other non-personal information available to the touch input analysis and display modification services, or publicly available information.

Example System Architecture

Figure 8:
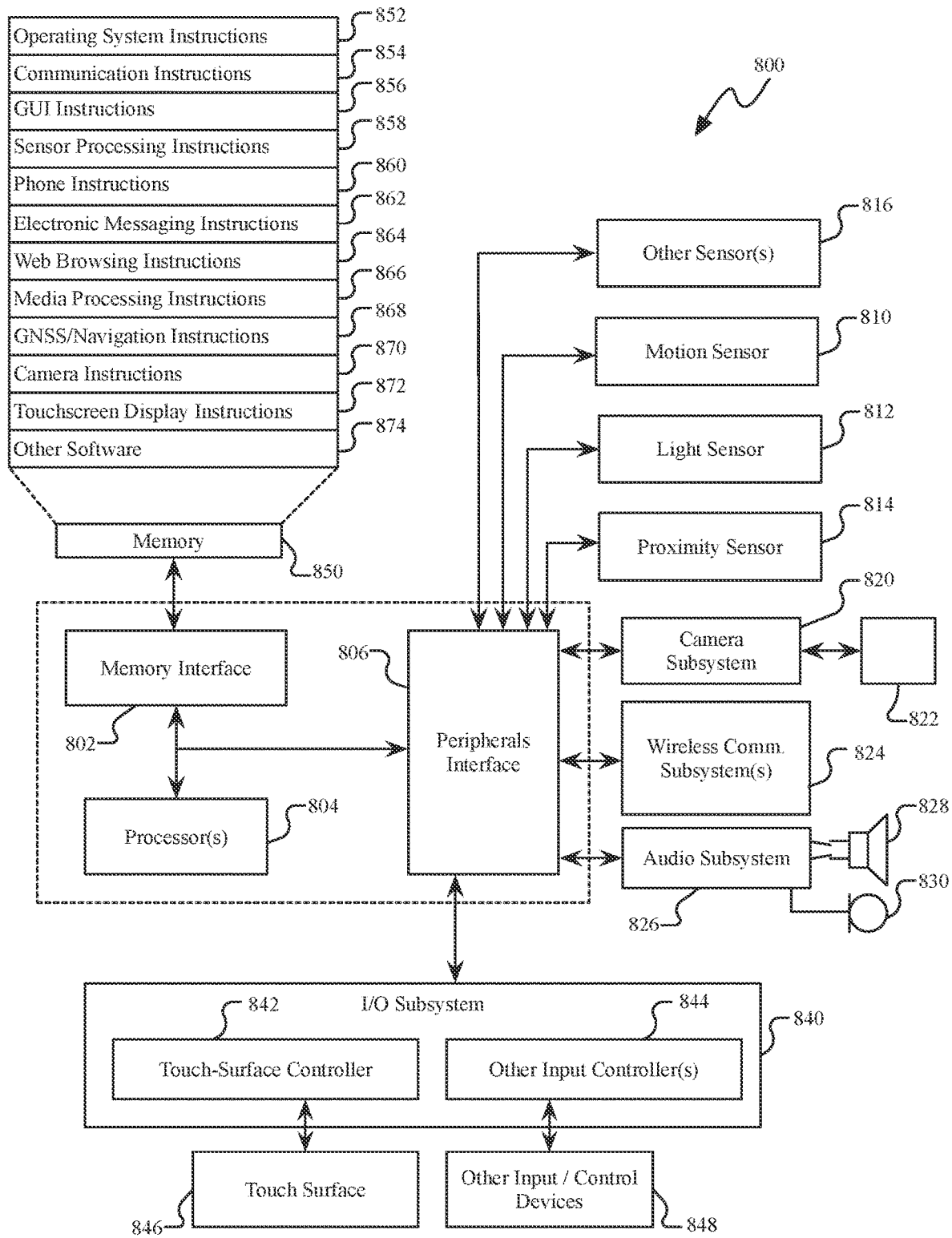
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 800 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voice printing and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing touch input analysis and display modification. For example, operating system 852 can implement the touch input analysis and display modification features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the touch input analysis and display modification processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A non-transitory computer readable medium comprising one or more sequences of instructions which, when executed by one or more processors, cause the one or more processors to perform operations comprising:
   displaying a first video frame, of a media composition, corresponding to a first position of a moveable playhead along a timeline, the first video frame being displayed in a first display area of a graphical user interface, the timeline being displayed in a second display area of the graphical user interface;
   detecting an initiation of a hover user input associated with a second position along the timeline, wherein the hover user input comprises at least one of:
      a first hover user input over the second position along the timeline, or
      a second hover user input over a representation of a second video frame of the media composition that corresponds to the second position along the timeline;
   responsive to detecting the initiation of the hover user input, replacing the display of the first video frame with a display of the second video frame of the media composition in the first display area of the graphical user interface; and
   responsive to detecting termination of the hover user input, resuming a display of the first video frame of the media composition and continuing playback of the media composition from the first video frame in the first display area of the graphical user interface.

2. The non-transitory computer readable medium as recited in claim 1, wherein a particular video frame of the media composition is displayed according to the position of the moveable playhead along the timeline at any given moment in time.

3. The non-transitory computer readable medium as recited in claim 1, wherein the second video frame is displayed during playback of a portion of the media composition that begins with the second video frame, and wherein playback of the portion of the media composition that begins with the second video frame is initiated in response to detecting the hover user input associated with the second position along the timeline.

4. The non-transitory computer readable medium as recited in claim 1, wherein detecting the initiation of the hover user input associated with the second position along the timeline comprises selecting a particular media clip from the media composition.

5. The non-transitory computer readable medium as recited in claim 1, wherein the operations further comprise:
   detecting an initiation of a subsequent hover user input associated with a third video frame, wherein the subsequent hover user input comprises at least one of:
      a third hover user input over a third position along the timeline associated with the third video frame, or
      a fourth hover user input over a representation of a media clip that corresponds to the third video frame; and
   responsive to detecting the initiation of the subsequent hover user input, replacing the display of the second video frame with a display of the third video frame in the first display area of the graphical user interface.

6. The non-transitory computer readable medium as recited in claim 1, wherein the representation of the second video frame is from a media clip displayed in a third display area of the graphical user interface, wherein the media composition comprises at least a portion of the media clip.

7. The non-transitory computer readable medium as recited in claim 1, wherein the initiation of the hover user input associated with the second position along the timeline is detected based on a position of a user input position being unchanged for a threshold period of time.

8. The non-transitory computer readable medium as recited in claim 1, wherein the initiation of the hover user input associated with the second position along the timeline is detected based on a user's finger or touch input device being less a threshold distance from a touchscreen display without contacting the touchscreen display.

9. A system comprising:
   one or more processors; and
   a non-transitory computer readable medium comprising one or more sequences of instructions which, when executed by the one or more processors, cause the one or more processors to perform operations comprising:
   displaying a first video frame, of a media composition, corresponding to a first position of a moveable playhead along a timeline, the first video frame being displayed in a first display area of a graphical user interface, the timeline being displayed in a second display area of the graphical user interface;
   detecting an initiation of a hover user input associated with a second position along the timeline, wherein the hover user input comprises at least one of:
   a first hover user input over the second position along the timeline, or
   a second hover user input over a representation of a second video frame of the media composition that corresponds to the second position along the timeline;
   responsive to detecting the initiation of the hover user input, replacing the display of the first video frame with a display of the second video frame of the media composition in the first display area of the graphical user interface; and
   responsive to detecting termination of the hover user input, resuming a display of the first video frame of the media composition and continuing playback of the media composition from the first video frame in the first display area of the graphical user interface.

10. The system as recited in claim 9, wherein a particular video frame of the media composition is displayed according to the position of the moveable playhead along the timeline at any given moment in time.

11. The system as recited in claim 9, wherein the second video frame is displayed during playback of a portion of the media composition that begins with the second video frame, and wherein playback of the portion of the media composition that begins with the second video frame is initiated in response to detecting the hover user input associated with the second position along the timeline.

12. The system as recited in claim 9, wherein detecting the initiation of the hover user input associated with the second position along the timeline comprises selecting a particular media clip from the media composition.

13. The system as recited in claim 9, wherein the operations further comprise:
- detecting an initiation of a subsequent hover user input associated with a third video frame, wherein the subsequent hover user input comprises at least one of:
- a third hover user input over a third position along the timeline associated with the third video frame, or
- a fourth hover user input over a representation of a media clip that corresponds to the third video frame; and
- responsive to detecting the initiation of the subsequent hover user input, replacing the display of the second video frame with a display of the third video frame in the first display area of the graphical user interface.

14. The system as recited in claim 9, wherein the representation of the second video frame is from a media clip displayed in a third display area of the graphical user interface, wherein the media composition comprises at least a portion of the media clip.

15. The system as recited in claim 9, wherein the initiation of the hover user input associated with the second position along the timeline is detected based on a position of a user input position being unchanged for a threshold period of time.

16. The system as recited in claim 9, wherein the initiation of the hover user input associated with the second position along the timeline is detected based on a user's finger or touch input device being less a threshold distance from a touchscreen display without contacting the touchscreen display.

17. A method comprising:
- displaying a first video frame, of a media composition, corresponding to a first position of a moveable playhead along a timeline, the first video frame being displayed in a first display area of a graphical user interface, the timeline being displayed in a second display area of the graphical user interface;
- detecting an initiation of a hover user input associated with a second position along the timeline, wherein the hover user input comprises at least one of:
- a first hover user input over the second position along the timeline, or
- a second hover user input over a representation of a second video frame of the media composition that corresponds to the second position along the timeline;
- responsive to detecting the initiation of the hover user input, replacing the display of the first video frame with a display of the second video frame of the media composition in the first display area of the graphical user interface; and
- responsive to detecting termination of the hover user input, resuming a display of the first video frame of the media composition and continuing playback of the media composition from the first video frame in the first display area of the graphical user interface.

18. The method as recited in claim 17, wherein the second video frame is displayed during playback of a portion of the media composition that begins with the second video frame, and wherein playback of the portion of the media composition that begins with the second video frame is initiated in response to detecting the hover user input associated with the second position along the timeline.

\* \* \* \* \*